US010608777B2

(12) United States Patent
Ju et al.

(10) Patent No.: US 10,608,777 B2
(45) Date of Patent: Mar. 31, 2020

(54) APPARATUS AND METHOD FOR PHYSICAL LAYER SECURITY COMMUICATION IN WIRELESS COMMUNICATION SYSTEM

(71) Applicant: ELECTRONICS AND TELECOMMUNICATIONS RESEARCH INSTITUTE, Daejeon (KR)

(72) Inventors: Hyung Sik Ju, Hwaseong-si (KR); Dong Hyuk Gwak, Daejeon (KR); Seon Ae Kim, Daejeon (KR); Jung Bo Son, Daejeon (KR); Yu Ro Lee, Daejeon (KR); Hyun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/207,585

(22) Filed: Dec. 3, 2018

(65) Prior Publication Data
US 2019/0181974 A1 Jun. 13, 2019

(30) Foreign Application Priority Data

Dec. 11, 2017 (KR) .................. 10-2017-0169464
Nov. 5, 2018 (KR) .................. 10-2018-0134351

(51) Int. Cl.
*H04K 3/00* (2006.01)
*H04W 72/04* (2009.01)
(Continued)

(52) U.S. Cl.
CPC ............. *H04K 3/42* (2013.01); *H04J 11/004* (2013.01); *H04K 3/43* (2013.01); *H04K 3/44* (2013.01);
(Continued)

(58) Field of Classification Search
CPC ..... H04K 3/228; H04K 3/42; H04W 72/0406; H04W 12/1201
(Continued)

(56) References Cited

U.S. PATENT DOCUMENTS 4,388,723 A * 6/1983 Keen .................. H01Q 3/2617
342/17
9,154,474 B2 10/2015 Lim et al.
(Continued)

FOREIGN PATENT DOCUMENTS

CN         101692614 A     4/2010
JP          2006-019897 A    1/2006
KR    10-2013-0069018 A    6/2013

*Primary Examiner* — John J Lee
(74) *Attorney, Agent, or Firm* — LRK Patent Law Firm

(57) ABSTRACT

An operation method of a terminal in a wireless communication system includes: transmitting uplink (UL) traffic information indicating a size of a UL data signal to a base station; receiving a jamming message generated based on the UL traffic information from the base station; generating an uplink (UL) transmission signal including the UL data signal and a UL jamming signal based on the jamming message; and transmitting the UL transmission signal to the base station. Also, the jamming message indicates a pattern of the UL jamming signal, the UL transmission signal is transmitted in a same frequency band as a frequency band in which a downlink (DL) transmission signal of the base station is received, and the UL jamming signal is transmitted in remaining resources excluding resources occupied by the UL data signal in the frequency band.

20 Claims, 19 Drawing Sheets

(51) Int. Cl.
  *H04W 12/12* (2009.01)
  *H04J 11/00* (2006.01)
  *H04L 27/26* (2006.01)
  *H04L 27/34* (2006.01)

(52) U.S. Cl.
  CPC ......... *H04K 3/825* (2013.01); *H04L 27/2613* (2013.01); *H04L 27/2626* (2013.01); *H04L 27/2647* (2013.01); *H04W 12/1201* (2019.01); *H04W 72/0453* (2013.01); *H04L 27/2628* (2013.01); *H04L 27/34* (2013.01)

(58) Field of Classification Search
  USPC ................ 455/1, 67.11, 66.1, 3.05, 452.1
  See application file for complete search history.

(56) References Cited

U.S. PATENT DOCUMENTS

| | | | |
|---|---|---|---|
| 9,699,664 B2 | 7/2017 | Jover | |
| 2006/0002559 A1 | 1/2006 | Kachi | |
| 2009/0093211 A1 | 4/2009 | Chu et al. | |
| 2010/0265128 A1* | 10/2010 | Martens | G01S 19/38 342/357.25 |
| 2011/0033051 A1 | 2/2011 | Steer et al. | |
| 2013/0266142 A1 | 10/2013 | Hwang et al. | |
| 2016/0149951 A1* | 5/2016 | Nam | H04L 63/18 726/23 |
| 2017/0289108 A1* | 10/2017 | Lee | H04L 5/0055 |

\* cited by examiner

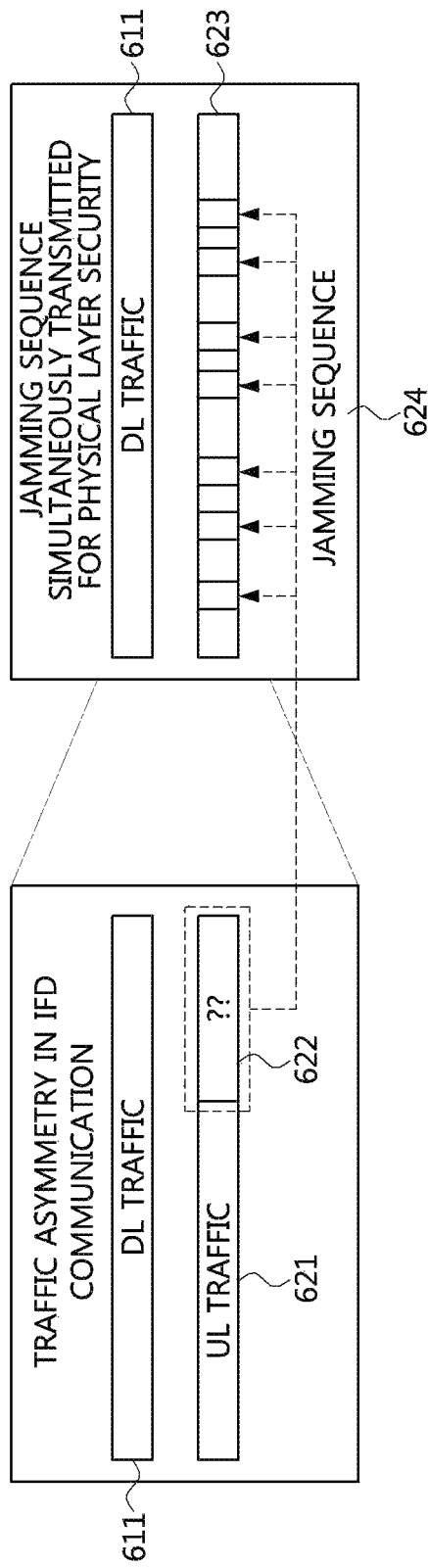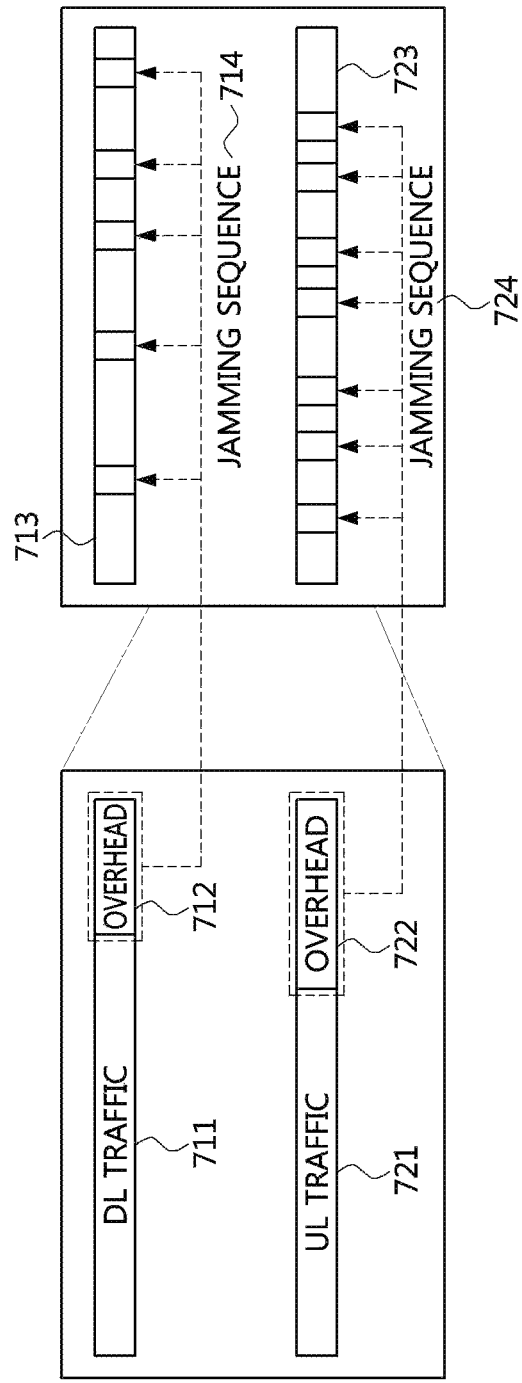

APPARATUS AND METHOD FOR PHYSICAL LAYER SECURITY COMMUICATION IN WIRELESS COMMUNICATION SYSTEM

CROSS-REFERENCE TO RELATED APPLICATIONS

This application claims priority to Korean Patent Application Nos. 10-2017-0169464, filed Dec. 11, 2017, and 10-2018-0134351, filed Nov. 5, 2018, in the Korean Intellectual Property Office (KIPO), the entire contents of which are hereby incorporated by reference.

BACKGROUND

1. Field of the Invention

The present disclosure relates to a wireless communication system, and more specifically, to an apparatus and a method for physical layer security communication.

2. Description of Related Art

The physical layer security communication refers to a secure communication technology that essentially blocks eavesdropping of signals in the physical layer using the physical characteristics of the wireless channel.

For example, a transmitter may add an overhead or redundancy signal to data signal such that the eavesdropper cannot eavesdrop on the data signal. Since radio resources through which the data signal can be transmitted are limited, when the overhead or redundancy signal for security is added, resources capable of transmitting the data signal may be reduced. In this reason, the significant amount of overhead may occur in a wireless communication system to prevent eavesdropping on both a transmission signal transmitted from the transmitter and a reception signal received by a receiver. As a result, a problem that the data transmission rate is remarkably lowered may occur.

SUMMARY

Accordingly, embodiments of the present disclosure provide an operation method of a terminal and a base station for utilizing a transmission signal and a reception signal, which are transmitted and received in the same band, as a jamming signal in a communication system supporting an in-band full duplex (IFD) scheme.

Accordingly, embodiments of the present disclosure also provide an operation method of a terminal and a base station for generating a jamming signal by using a resource which is not utilized based on a traffic asymmetry of a transmission signal and a reception signal which are transmitted and received in the same band.

In order to achieve the objective of the present disclosure, an operation method of a terminal, in a wireless communication system, may comprise transmitting uplink (UL) traffic information indicating a size of a UL data signal to a base station; receiving a jamming message generated based on the UL traffic information from the base station; generating an uplink (UL) transmission signal including the UL data signal and a UL jamming signal based on the jamming message; and transmitting the UL transmission signal to the base station, wherein the jamming message indicates a pattern of the UL jamming signal, the UL transmission signal is transmitted in a same frequency band as a frequency band in which a downlink (DL) transmission signal of the base station is received, and the UL jamming signal is transmitted in remaining resources excluding resources occupied by the UL data signal in the frequency band.

The UL jamming signal may be mixed with the UL data signal in at least one of time domain and frequency domain according to the pattern indicated by the jamming message and then transmitted in the frequency band.

The size of the remaining resources may correspond to a difference between the size of resources occupied by the UL data signal and the size of resources occupied by a DL data signal in the frequency band.

A DL jamming signal may be mixed with a DL data signal according to the pattern indicated by the jamming message, the DL jamming signal may be transmitted through remaining resources excluding resources occupied by the DL data signal in the frequency band, and the DL jamming signal may be removed from the DL transmission signal according to the pattern indicated by the jamming message.

The UL traffic information may be included in a radio resource control (RRC) layer message transmitted to the base station.

In order to achieve the objective of the present disclosure, an operation method of a base station, in a wireless communication system, may comprise receiving uplink (UL) traffic information indicating a size of a UL data signal from a terminal; generating a jamming message indicating a pattern of a UL jamming signal based on the UL traffic information; transmitting the jamming message to the terminal; receiving a UL transmission signal including the UL jamming signal generated based on the jamming message from the terminal; and transmitting a downlink (DL) transmission signal to the terminal in a same frequency band as a frequency band in which the UL transmission signal is received, wherein the UL jamming signal is received in remaining resources excluding resources occupied by the UL data signal in the frequency band.

The UL jamming signal may be mixed with the UL data signal in at least one of time domain and frequency domain according to the pattern indicated by the jamming message and then transmitted in the frequency band.

The size of the remaining resources may correspond to a difference between the size of resources occupied by the UL data signal and the size of resources occupied by a DL data signal in the frequency band.

The UL jamming signal may be removed from the UL transmission signal according to the pattern indicated by the jamming message.

The UL traffic information may be included in a radio resource control (RRC) layer message received from the terminal.

In order to achieve the objective of the present disclosure, An operation method of a base station, in a wireless communication system, may comprise receiving uplink (UL) traffic information indicating a size of a UL data signal from a first terminal; generating a UL jamming message indicating a first pattern of a UL jamming signal based on a size of the UL data signal; generating a downlink (DL) jamming message indicating a second pattern of a DL jamming signal based on a size of the UL data signal and a size of a DL data signal to be transmitted to a second terminal; transmitting the UL jamming message to the first terminal; transmitting the DL jamming message to the second terminal; receiving a UL transmission signal including the UL jamming signal generated based on the UL jamming message from the first terminal; and transmitting a DL transmission signal including the DL jamming signal generated based on the DL jamming message to the second terminal.

The DL transmission signal may be transmitted in a same frequency band as a frequency band in which the UL transmission signal is received.

The DL jamming signal may be transmitted in remaining resources excluding resources occupied by the DL data signal in the frequency band in which the DL transmission signal is transmitted.

The UL jamming signal may be transmitted in remaining resources excluding resources occupied by the UL data signal in the frequency band in which the UL transmission signal is transmitted.

The DL jamming signal may be mixed with the DL data signal in at least one of time domain and frequency domain according to the second pattern indicated by the DL jamming message and then transmitted in the frequency band.

The UL jamming signal may be mixed with the UL data signal in at least one of time domain and frequency domain according to the first pattern indicated by the UL jamming message and then transmitted in the frequency band.

The UL jamming signal may be removed from the UL transmission signal according to the first pattern indicated by the UL jamming message.

The UL traffic information may be included in a radio resource control (RRC) layer message received from the terminal.

The DL jamming message may include co-channel interference cancelation (CCIC) information indicating whether the first terminal performs a CCIC operation, the CCIC indication information may be generated based on CCI channel feedback information indicating a degree of CCI, which is received from the second terminal, the CCI channel feedback information may be generated based on a strength of a signal transmitted by the first terminal, and the strength of the signal transmitted by the first terminal may be measured based on the UL traffic information received from the first terminal.

The UL jamming message may include power control information indicating a transmission power of the first terminal, and the power control information may be generated based on the CCI channel feedback information.

According to the embodiments of the present disclosure, based on asymmetry of the sizes of the transmission signal and the reception signal transmitted and received in the same band, a jamming signal can be transmitted using resources not used for data traffic transmission, and thus the data transmission rate can be increased without any additional overhead.

BRIEF DESCRIPTION OF DRAWINGS

Embodiments of the present disclosure will become more apparent by describing in detail embodiments of the present disclosure with reference to the accompanying drawings, in which:

FIG. 6 is a conceptual diagram illustrating a jamming sequence and a pattern of the jamming sequence inserted in a UL transmission signal in a wireless communication system according to a second embodiment of the present disclosure;

FIG. 7 is a conceptual diagram illustrating a jamming sequence and a pattern of the jamming sequence inserted in a DL transmission signal and a UL transmission signal in a wireless communication system according to a second embodiment of the present disclosure;

DETAILED DESCRIPTION

Figure 1:
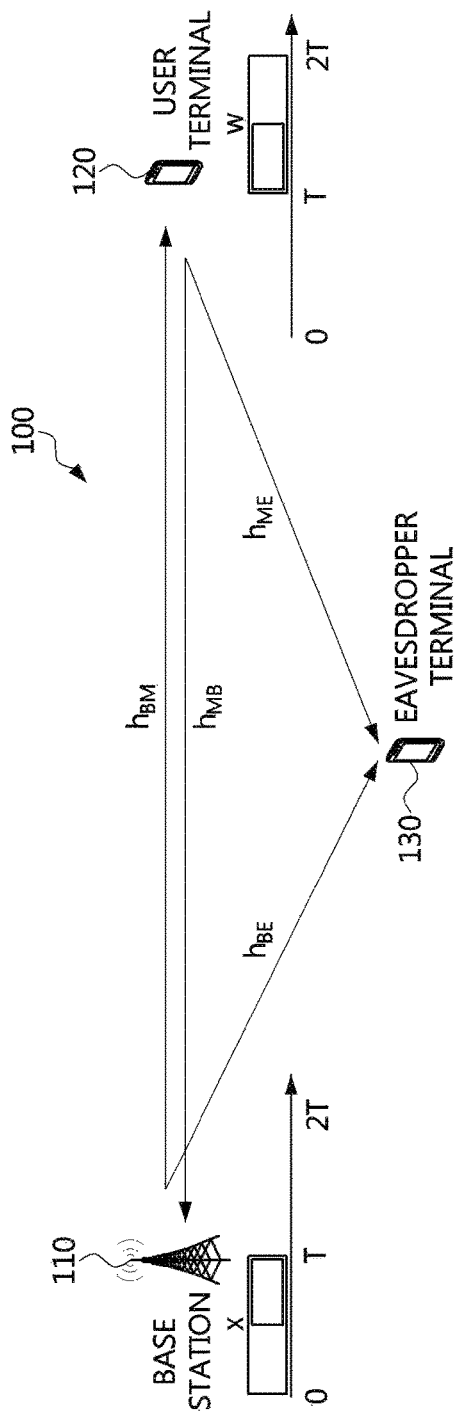
FIG. 1 is a conceptual diagram illustrating a wireless communication system according to a first embodiment of the present disclosure.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

Throughout the specification, a terminal may be a mobile terminal (MT), a mobile station (MS), an advanced mobile station (AMS), a high reliability mobile station (HR-MS), a subscriber station (SS), a portable subscriber station (PSS), an access terminal (AT), a user equipment (UE), or the like, and may have all or a part of functions of the MT, MS, AMS, HR-MS, SS, PSS, AT, UE, or the like.

Also, a base station (BS) may be an advanced base station (ABS), a high reliability base station (HR-BS), a node B (NodeB), an evolved node B (eNodeB), an access point (AP), a radio access station (RAS), a base transceiver station (BTS), a mobile multi-hop relay (MMR) BS, a relay station (RS) performing a role of base station, a high reliability relay station (HR-RS) performing a role of base station, a small station, or the like, and may have all or a part of functions of the ABS, HR-BS, Node B, eNodeB, AP, RAS, BTS, MMR-BS, RS, HR-RS, small base station, or the like.

FIG. 1 is a conceptual diagram illustrating a wireless communication system according to a first embodiment of the present disclosure.

Referring to FIG. 1, a wireless communication system 100 may comprise a base station 110, a user terminal 120, and an eavesdropper terminal 130. Although FIG. 1 shows one base station 110 for convenience of explanation, the number of base stations may be plural. Although FIG. 1 shows one user terminal 120 for convenience of explanation, the number of user terminals may be plural. Although FIG. 1 shows one eavesdropper terminal 130 for convenience of explanation, the number of eavesdropper terminals may be plural.

Each of the base station 110, the user terminal 120, and the eavesdropper terminal 130 may support at least one communication protocol. Here, the communication protocol may include a communication protocol based on a code division multiple access (CDMA), a communication protocol based on a wideband CDMA (WCDMA), a communication protocol based on a time division multiple access (TDMA), a communication protocol based on a frequency division multiple access (FDMA), a communication protocol based on an orthogonal frequency division multiplexing (OFDM), a communication protocol based on an orthogonal frequency division multiple access (OFDMA), a communication protocol based on a single carrier-FDMA (SC-FDMA), a communication protocol based on a non-orthogonal multiple access (NOMA), and a communication protocol based on a space division multiple access (SDMA).

For example, the wireless communication system 100 may be a wireless communication system according to an in-band full duplex (IFD) scheme. In this case, the base station 110 and the user terminal 120 may transmit data at different times. For example, the base station 110 may transmit data x to the user terminal 120 via a downlink (DL) during a period from 0 to T. The user terminal 120 may receive the data x from the base station 110 via the DL during the period from 0 to T.

Also, the user terminal 120 may transmit data w to the base station 110 via an uplink (UL) during a period from T to 2T. The base station 110 may receive the data w from the user terminal 120 via the UL during the period from T to 2T.

Here, the eavesdropper terminal 130 may eavesdrop on the data x transmitted from the base station 110 during the period from 0 to T. Also, the eavesdropper terminal 130 may eavesdrop on the data w transmitted by the user terminal 120 from the period from T to 2T.

Therefore, the wireless communication system according to the IFD scheme should consider eavesdropping on both the UL transmission signal and the DL transmission signal. That is, overhead for security for the UL transmission signal and the DL transmission signal may occur in the bidirectional communication system. Accordingly, in the IFD-based wireless communication system, a data transmission rate may be degraded due to the security overhead.

Figure 2:
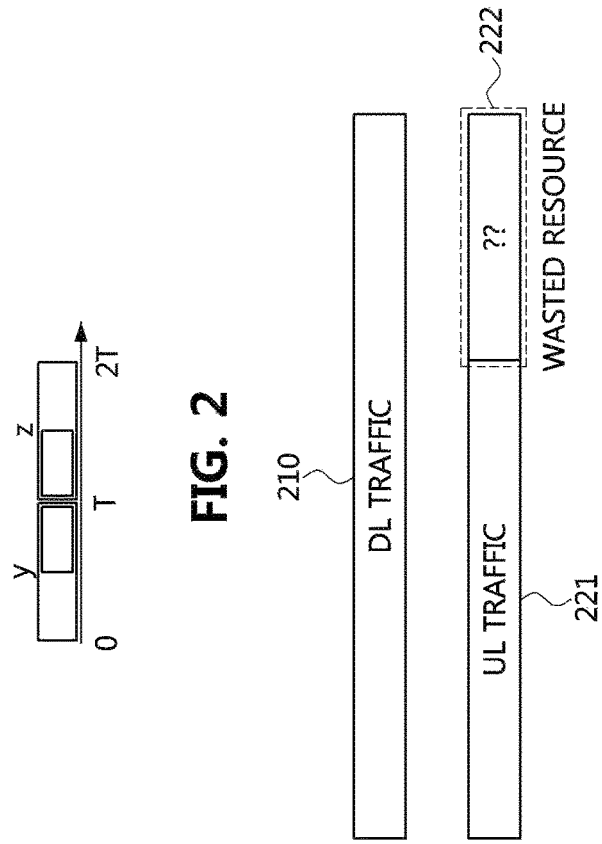
FIG. 2 is a conceptual diagram illustrating a UL transmission signal and a DL transmission signal used in a wireless communication system according to a second embodiment of the present disclosure.

For example, the UL transmission signal and the DL transmission signal in the IFD-based wireless communication system may be configured as shown in FIG. 2.

FIG. 2 is a conceptual diagram illustrating a UL transmission signal and a DL transmission signal used in a wireless communication system according to a second embodiment of the present disclosure.

Referring to FIG. 2, in the IFD-based wireless communication system, a base station may transmit DL traffic 210 to a terminal. At the same time, the base station may receive UL traffic 221 from the terminal on the same frequency band as the frequency band in which the DL traffic 210 is transmitted.

Also, the terminal may receive the DL traffic 210 from the base station. At the same time, the terminal may transmit the UL traffic 221 to the base station through the same frequency band as the frequency band in which the DL traffic 210 is received.

That is, the DL traffic 210 and the UL traffic 221 may be simultaneously transmitted and received in the same frequency band. Therefore, the data transmission rate in the IFD-based wireless communication system may be increased up to twice as much as the data transmission rate in a conventional unidirectional wireless communication system.

However, the IFD-based wireless communication system can achieve the maximum data transmission efficiency only when the DL traffic and the UL traffic have the same size. For example, in the IFD-based wireless communication system, the size of the UL traffic 211 may be smaller than the size of the DL traffic 210. In this case, since the size of a UL transmission signal including the UL traffic 211 should be matched to the size of a DL transmission signal including the DL traffic 210, a wasted time or frequency resource 222 in which data is not transmitted may be present due to the difference between the size of the DL traffic 210 and the size of the UL traffic 211. That is, when the size of the DL traffic 210 differs from the size of the LTL traffic 211, the gain for the data transmission rate may be reduced by generating the wasted resource 222.

Here, the base station may operate in the same or similar manner as the base station 110 of FIG. 1. Further, the terminal may operate in the same or similar manner as the user terminal 120 of FIG. 1. The structure of the base station 110, the user terminal 120, and the eavesdropper terminal 130 of FIG. 1 may be the same as or similar to a structure of a communication node 300 shown in FIG. 3.

Figure 3:
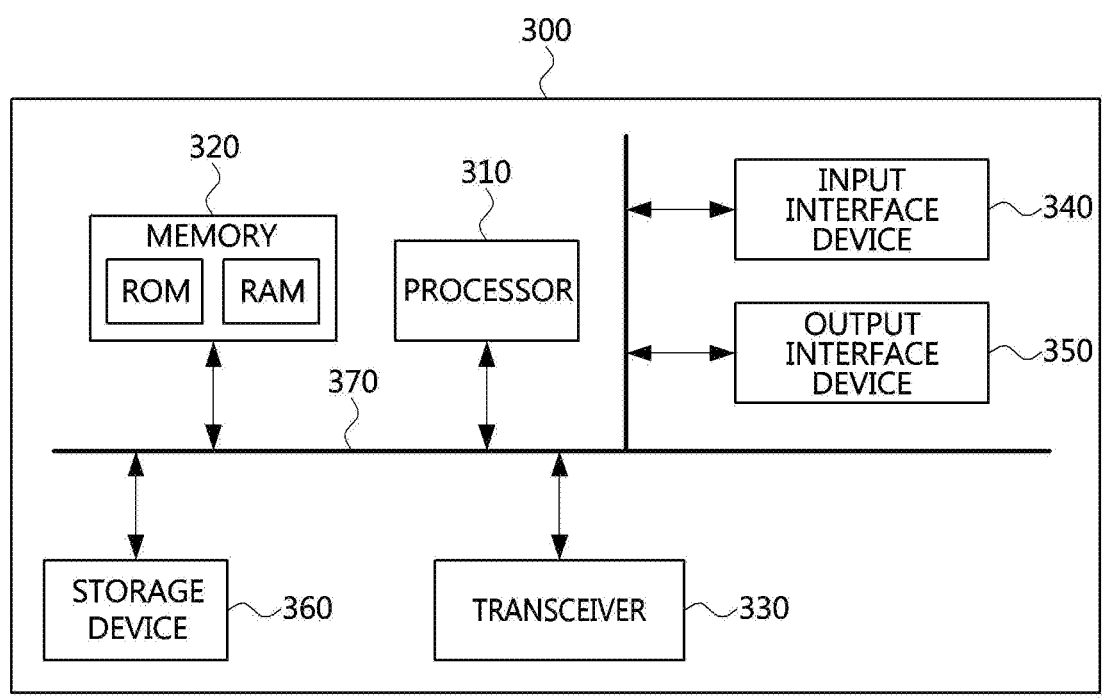
FIG. 3 is a block diagram illustrating a communication node in a wireless communication system according to a first embodiment of the present disclosure.

FIG. 3 is a block diagram illustrating a communication node in a wireless communication system according to a first embodiment of the present disclosure.

Referring to FIG. 3, a communication node 300 may comprise at least one processor 310, a memory 320, and a transceiver 330 connected to the network for performing communications. Also, the communication node 300 may further comprise an input interface device 340, an output interface device 350, a storage device 360, and the like. Each component included in the communication node 300 may communicate with each other as connected through a bus 370.

However, each component included in the communication node 300 may be connected to the processor 310 via an individual interface or a separate bus, rather than the common bus 370. For example, the processor 310 may be connected to at least one of the memory 320, the transceiver 330, the input interface device 340, the output interface device 350, and the storage device 360 via a dedicated interface.

The processor 310 may execute a program stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may be constituted by at least one of a volatile storage medium and a non-volatile storage medium. For example, the memory 320 may comprise at least one of read-only memory (ROM) and random access memory (RAM).

The communication node 300 may operate in an IFD-based wireless communication system. The IFD-based wireless communication system will be described with reference to FIG. 4.

Figure 4:
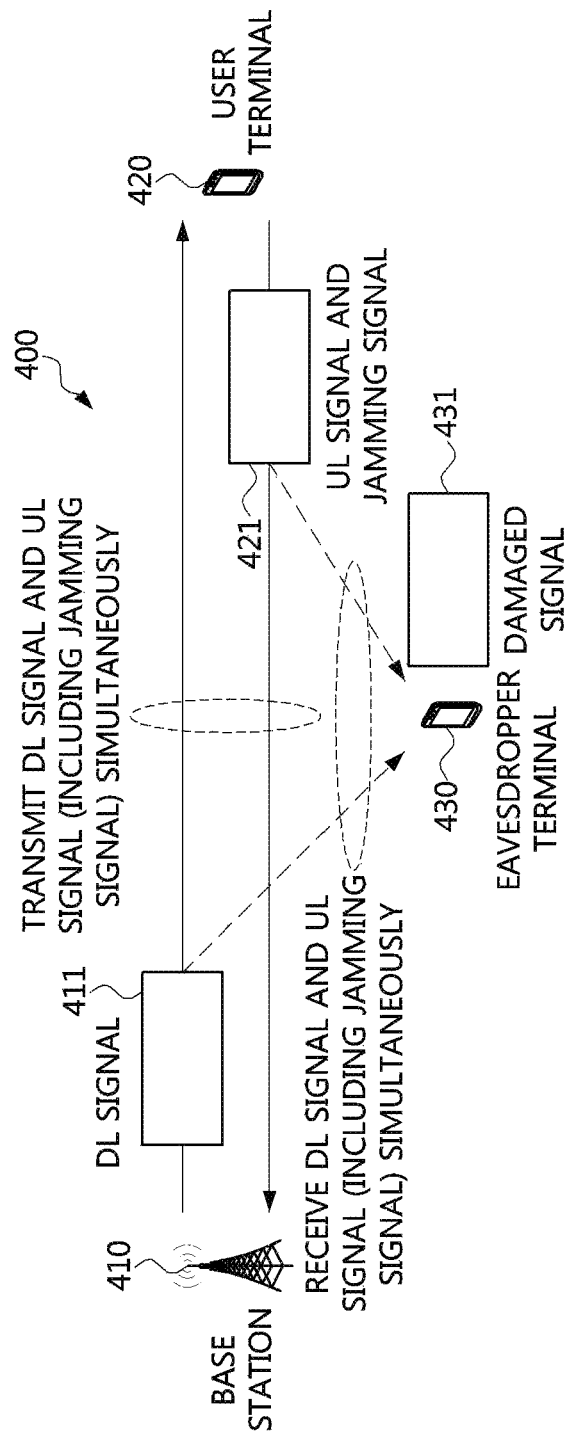
FIG. 4 is a conceptual diagram illustrating a wireless communication system based on an IFD scheme according to a second embodiment of the present disclosure.

FIG. 4 is a conceptual diagram illustrating a wireless communication system based on an IFD scheme according to a second embodiment of the present disclosure.

Referring to FIG. 4, a wireless communication system 400 may comprise a base station 410, a user terminal 420, and an eavesdropper terminal 430. Here, the wireless communication system 400 may be the same as or similar to the wireless communication system 100 of FIG. 1. The user terminal 420 may be the same as or similar to the user terminal 120 of FIG. 1. Also, the eavesdropper terminal 430 may be the same as or similar to the eavesdropper terminal 130 of FIG. 1.

The base station 410 may transmit a DL transmission signal 411 to the user terminal 420. At the same time, the base station 410 may receive a UL transmission signal 421 including a jamming signal from the user terminal 420 in the same frequency band as the frequency band in which the DL transmission signal 411 is transmitted.

Likewise, the user terminal 420 may receive the DL transmission signal 411 from the base station 410. At the same time, the user terminal 420 may transmit the UL transmission signal 421 including a jamming signal to the base station 410 in the same frequency band as the frequency band in which the DL transmission signal 411 is received.

That is, the DL transmission signal 411 and the UL transmission signal 421 may be simultaneously transmitted in the same frequency band. In the IFD-based wireless communication system 400, the base station 410 and the user terminal 420 may simultaneously transmit signals in the same frequency band. Therefore, the data transmission rates of UL and DL in the IFD-based wireless communication system 400 can be improved.

Here, the eavesdropper terminal 430 may simultaneously receive the DL transmission signal 411 and the UL transmission signal 421. The signal received by the eavesdropper terminal 430 may be a mixture of the DL transmission signal 411 and the UL transmission signal 421. That is, the DL transmission signal 411 and the UL transmission signal 421 in the signal received by the eavesdropper terminal 430 may mutually protect each other by acting as a jamming signal for each other. Also, when the size of the DL data traffic is smaller than the size of the UL data traffic, the base station 410 may improve security by transmitting an additional jamming signal or an artificial noise using the remaining resources. Similarly, when the size of the UL data traffic is smaller than the size of the DL data traffic, the user terminal 420 may improve security by transmitting an additional jamming signal or an artificial noise using the remaining resources.

A physical layer security communication procedure between the base station 410 and the user terminal 420 using the jamming signal will be described with reference to FIG. 5.

Figure 5:
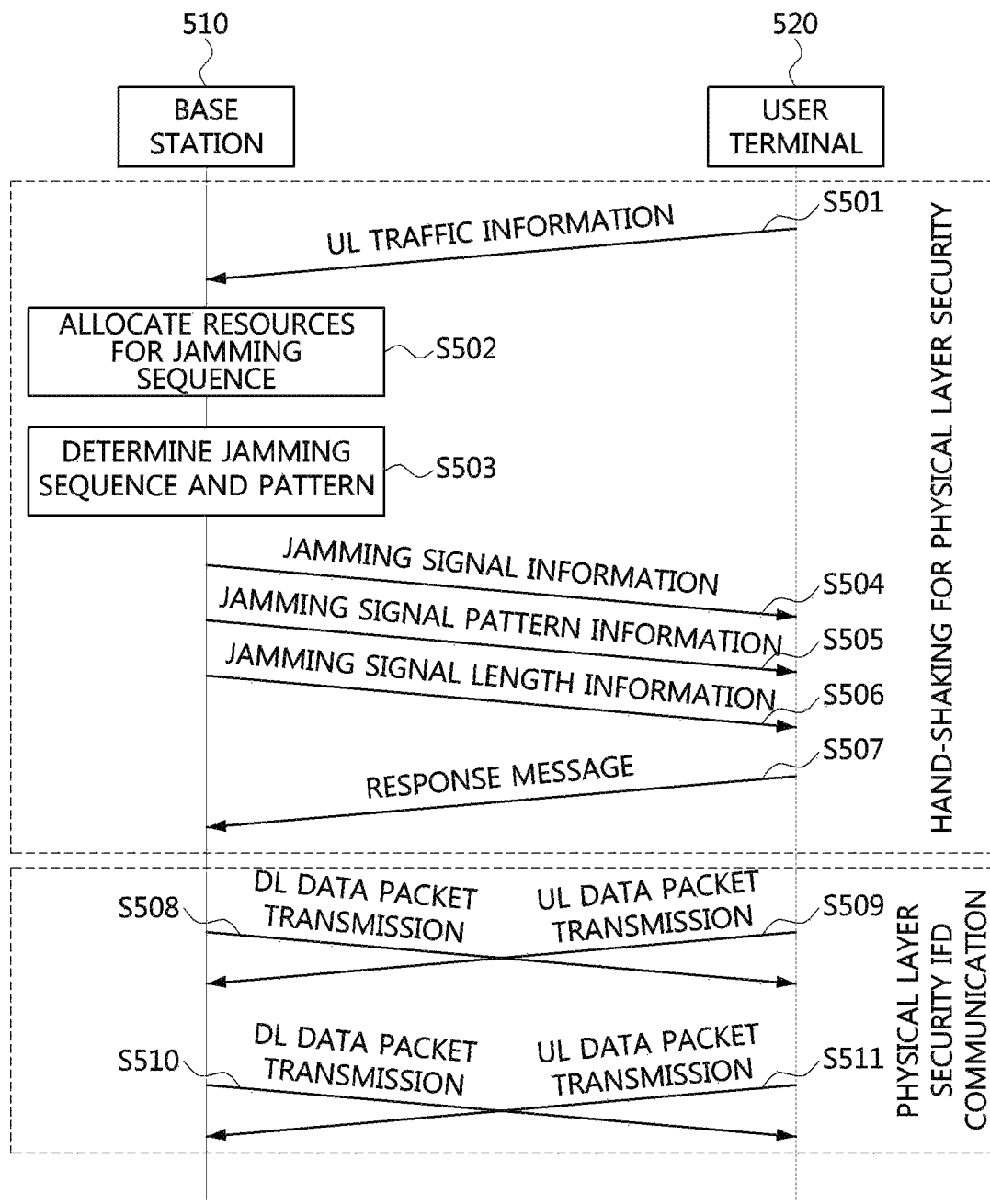
FIG. 5 is a sequence chart illustrating flows of signals transmitted and received between a base station and a terminal in a wireless communication system according to a second embodiment of the present disclosure.

FIG. 5 is a sequence chart illustrating flows of signals transmitted and received between a base station and a terminal in a wireless communication system according to a second embodiment of the present disclosure.

Referring to FIG. 5, the wireless communication system may be a long term evolution (LTE) system. Here, a procedure of FIG. 5 may be included in a radio resource control (RRC) connection establishment procedure. Here, it is assumed that the LTE system supports the IFD scheme.

For example, the user terminal 520 may transmit UL traffic information to the base station 510 (S501). The UL traffic information may be included in a RRC connection request message. The UL traffic information may include information on UL data traffic that the user terminal 520 desires to transmit via the UL. Also, a control message for determining whether to use the UL traffic information may be used.

The base station 510 may receive the UL traffic information from the user terminal 520. For example, the base station 510 may receive the RRC connection request message that includes the UL traffic information from the user terminal 520.

The base station 510 may allocate resources for a jamming sequence based on the UL traffic information received from the user terminal 520 (S502). For example, the base station 510 may confirm the size of the UL data traffic to be transmitted by the user terminal 520 based on the UL traffic information received from the user terminal 520. The base station 510 may compare the size of the UL data traffic to be transmitted by the user terminal 520 with the size of DL data traffic that the base station 510 desires to transmit via the DL. The base station 510 may determine the number of symbols for transmitting the DL data traffic and the UL data traffic simultaneously via the UL and DL in the same frequency band based on the required size of the UL data traffic and the required size of the DL data traffic.

The base station 510 may determine a jamming sequence and a jamming sequence pattern based on the determined number of symbols (S503). An operation of the base station 510 for determining the jamming sequence and the jamming sequence pattern will be described below with reference to FIGS. 6 to 11.

FIG. 6 is a conceptual diagram illustrating a jamming sequence and a pattern of the jamming sequence inserted in a UL transmission signal in a wireless communication system according to a second embodiment of the present disclosure.

Referring to FIG. 6, the size of DL data traffic 611 transmitted simultaneously in the same frequency band in the IFD scheme may exceed the size of UL data traffic 621. Here, among the resources for UL transmission, wasted resources 622 corresponding to a difference between the size of the DL data traffic 611 and the size of the UL data traffic 621 may be generated.

The base station 510 may determine a jamming sequence based on the remaining resources 622 among the resources for UL transmission. For example, the base station 510 may determine a jamming sequence 624 generated in a pseudo-random manner based on the size of the remaining resources 622. Also, the base station 510 may determine a pattern for inserting the jamming sequence 624 into a UL transmission signal 623 based on a pseudo random manner. That is, the base station 510 may determine the UL transmission signal 623 including the jamming sequence 624 and the UL data traffic 621.

A method of determining the transmission signal described above may be applied even when the size of the UL data traffic exceeds the size of the DL data traffic. Further, the jamming sequence may be inserted not only in the UL transmission signal but also in a DL transmission signal. The jamming sequence and the pattern of the jamming sequence inserted in the UL transmission signal and the DL transmission signal will be described with reference to FIG. 7.

FIG. 7 is a conceptual diagram illustrating a jamming sequence and a pattern of the jamming sequence inserted in a DL transmission signal and a UL transmission signal in a wireless communication system according to a second embodiment of the present disclosure.

Referring to FIG. 7, the base station 510 may determine resources 712 for a DL jamming sequence 714 in addition to resources for DL data traffic 711 among the resources for DL transmission. Also, the base station 510 may determine resources 722 for a UL jamming sequence 724 in addition to resources for UL data traffic 721 among the resources for UL transmission.

The base station 510 may determine the DL jamming sequence 714 based on the size of the resources 712 for the DL jamming sequence 714. For example, the base station 510 may determine the DL jamming sequence 714, which is generated in a pseudo random manner, based on the size of the resources 712 for the DL jamming sequence 714. Also, the base station 510 may determine a pattern for inserting the jamming sequence 714 into a DL transmission signal 713 based on a pseudo random manner. That is, the base station 510 may determine the DL transmission signal 713 including the DL data traffic 711 and the DL jamming sequence 714.

Likewise, the base station 510 may determine the UL jamming sequence 724 based on the size of the resources 722 for the UL jamming sequence 724. For example, the base station 510 may determine the UL jamming sequence 724, which is generated in a pseudo random manner, based on the size of the resources 722 for the UL jamming sequence 724. Also, the base station 510 may determine a pattern for inserting the jamming sequence 724 into a UL transmission signal 723 based on a pseudo random manner. That is, the base station 510 may determine the UL transmission signal 723 including the UL data traffic 721 and the UL jamming sequence 724.

Here, the DL jamming sequence 714 and the UL jamming sequence 724 may be the same or different type of jamming sequences. Also, the pattern of the DL jamming sequence 714 and the pattern of the UL jamming sequence 724 may be the same or different.

The data traffic generation method including the jamming sequence described above may be applied when the difference between the size of UL data traffic and the size of DL data traffic is less than a predetermined size. Alternatively, it may be applied when stronger security is required for the DL data traffic or the UL data traffic.

For example, the jamming sequence may be represented by a code book matrix as shown in Equation 1 below. Here, the jamming sequence may be the same as or similar to at least one of the UL jamming sequence 623 in FIG. 6, the DL jamming sequence 714 in FIG. 7, and the UL jamming sequence 724 in FIG. 7.

$$J = \begin{bmatrix} J_{1,1} & J_{1,2} & \cdots & J_{1,N} \\ J_{2,1} & J_{2,2} & \cdots & J_{2,N} \\ \vdots & \vdots & \ddots & \vdots \\ J_{M,1} & J_{M,2} & \cdots & J_{M,N} \end{bmatrix} \quad \text{[Equation 1]}$$

Here, M may mean the number of jamming sequences. N may mean the maximum length of each jamming sequence. Also, N may mean the number of subcarriers of the OFDM symbol or the FFT size, assuming that the transmission signals are generated in the OFDM scheme.

That is, each element $J_{m,n}$ of J may be defined as a value having a complex Gaussian distribution with a zero mean and a unit variance. Here, m=1 . . . , M, and n=1, . . . , N.

Further, the pattern of the jamming sequence may be represented by a codebook matrix as shown in Equation 2 below.

$$Q = \begin{bmatrix} q_{1,1} & q_{1,2} & \cdots & q_{1,N} \\ q_{2,1} & q_{2,2} & \cdots & q_{2,N} \\ \vdots & \vdots & \ddots & \vdots \\ q_{P,1} & q_{P,2} & \cdots & q_{P,N} \end{bmatrix} \quad \text{[Equation 2]}$$

Here, N may have a random permutation value. P may have different permutation values.

The base station 510 may determine a transmission signal that includes a jamming sequence based on Equations 1 and 2. For example, it may be assumed that a ratio of the DL data traffic to the UL data traffic is 5:3, and the number of subcarriers through which the DL data traffic and the UL data traffic are transmitted is 64. In this case, the base station 510 may insert the jamming sequence into transmission signals $x_1$ to $x_5$ using the sequence of $J_{1,1}$ to $J_{1,64}$ and the sequence of $J_{2,1}$ to $J_{2,N}$ of the codebook matrix J of Equation 1.

For example, the jamming sequence of $J_{1,1}$ to $J_{1,26}$ may be inserted in the subcarriers indicated by $q_{1,1}$ to $q_{1,26}$ in the transmission signal $x_1$. The jamming sequence of $J_{1,27}$ to $J_{1,52}$ may be inserted in the subcarriers indicated by $q_{2,1}$ to $q_{2,26}$ in the transmission signal $x_2$. The jamming sequence of $J_{1,53}$ to $J_{1,64}$ and $J_{2,1}$ to $J_{2,24}$ may be inserted in the subcarriers indicated by $q_{3,1}$ to $q_{3,26}$ in the transmission signal $x_3$. The jamming sequence of $J_{2,25}$ to $J_{2,39}$ may be inserted in the subcarriers indicated by $q_{4,1}$ to $q_{4,25}$ in the transmission signal $x_4$. The jamming sequence of $J_{2,40}$ to $J_{2,64}$ may be inserted in the subcarriers indicated by $q_{5,1}$ to $q_{5,25}$ in the transmission signal $x_5$.

The base station 510 may generate information indicating the jamming sequence and the pattern. The information indicating the jamming sequence and the pattern will be described with reference to FIG. 8.

Figure 8:
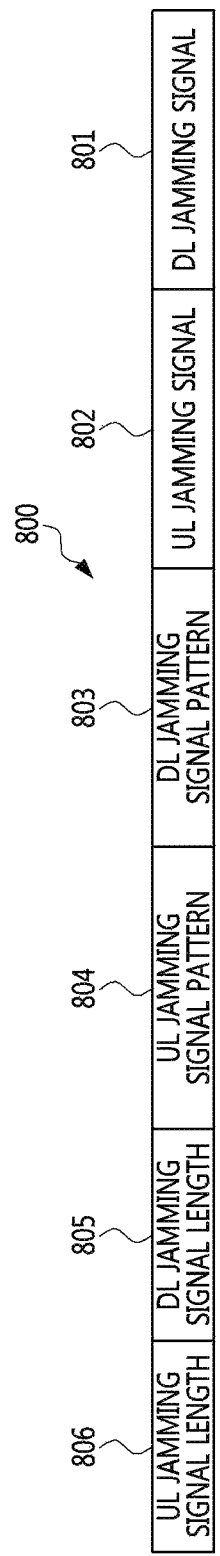
FIG. 8 is a conceptual diagram indicating information indicating a jamming sequence and a jamming sequence pattern in a wireless communication system according to a second embodiment of the present disclosure.

FIG. 8 is a conceptual diagram indicating information indicating a jamming sequence and a jamming sequence pattern in a wireless communication system according to a second embodiment of the present disclosure.

Referring to FIG. 8, jamming information 800 indicating a jamming sequence and a jamming sequence pattern may include a DL jamming signal field 801, a UL jamming signal field 802, a DL jamming signal pattern field 803, a UL jamming signal pattern field 804, a DL jamming signal length field 805, and a UL jamming signal length field 806.

The information 800 indicating the jamming sequence and pattern may be included in a security mode command message. In addition, a control message may be used to indicate whether the secure mode command message includes the information 800 indicating the jamming sequence and pattern.

The DL jamming signal field 801 may include DL jamming sequence information. For example, the DL jamming signal field 801 may indicate a jamming sequence included in the DL transmission signal. The DL jamming signal field 801 may indicate an address of a row of J in Equation 1.

The UL jamming signal field 802 may include UL jamming sequence information. For example, the UL jamming signal field 802 may indicate a jamming sequence included in the UL transmission signal. The UL jamming signal field 802 may indicate an address of a row of J in Equation 1.

The DL jamming signal pattern field 803 may include information on a pattern of the DL jamming signal. The DL jamming signal pattern field 803 may indicate a pattern of the jamming sequence included in the DL transmission signal. For example, the DL jamming signal pattern field 803 may indicate an address of a row of Q in Equation 2.

The UL jamming signal pattern field 804 may include information on a pattern of the LTL jamming signal. The UL jamming signal pattern field 804 may indicate a pattern of the jamming sequence included in the UL transmission signal. For example, the UL jamming signal pattern field 804 may indicate an address of a row of Q in Equation 2.

The DL jamming signal length field 805 may include DL jamming signal length information. For example, the DL Jamming signal length field 805 may indicate the length of the jamming sequence included in the DL transmission signal. The UL jamming signal length field 806 may include UL jamming signal length information. The UL jamming signal length field 806 may indicate the length of the jamming sequence included in the UL transmission signal.

For example, when the jamming sequence 624 is included only in the UL transmission signal 623 as shown in FIG. 6, the DL jamming signal length field 805 may indicate 0. In this case, since the jamming sequence is not inserted in the DL transmission signal 611, the base station 510 may not transmit information on the pattern of the jamming sequence for the DL transmission signal 611. Accordingly, the DL jamming signal length field 803 may be a field used as an optional field.

Likewise, when the jamming sequence is included only in the DL transmission signal, the UL jamming signal length field 806 may indicate 0. In this case, since the jamming sequence is not inserted in the UL transmission signal, the base station 510 may not transmit information on the pattern of the jamming sequence for the UL traffic. Accordingly, the UL jamming signal length field 804 may also be a field used as an optional field.

Also, as shown in FIG. 7, the DL jamming sequence 714 may be inserted into the DL transmission signal 713, and the UL jamming sequence 724 may be inserted into the UL transmission signal 723. In this case, the UL jamming signal length field 806 may include a value indicating the length of the UL jamming sequence 724. In addition, the DL jamming signal length field 805 may include a value indicating the length of the DL jamming sequence 714.

The precise values of the jamming sequence used in UL and DL may not be necessary for decoding the data. Thus, the DL jamming signal field 801 and the UL jamming signal field 802 may be selectively used.

The base station 510 may transmit the information 800 indicating the jamming sequence and pattern to the user terminal 520. The user terminal 520 may receive the information 800 indicating the jamming sequence and pattern from the base station 510.

Referring again to FIG. 5, the base station 510 may transmit the jamming signal information to the user terminal 520 (S504). The jamming signal information may include the DL jamming signal field 801 and the LTL jamming signal field 802. The user terminal 520 may receive the DL jamming signal field 801 and the UL jamming signal field 802 from the base station 510. The user terminal 520 may confirm whether or not the jamming sequence is inserted in the DL transmission signal and the UL transmission signal based on the DL jamming signal field 801 and the LTL jamming signal field 802 received from the base station 510. As described with reference to FIG. 8, the DL jamming signal field 801 and the LTL jamming signal field 802 may be selectively used.

The base station 510 may transmit the jamming signal pattern information to the user terminal 520 (S505). The jamming signal pattern information may include the DL jamming signal pattern field 803 and the UL jamming signal pattern field 804. The user terminal 520 may receive the DL jamming signal pattern field 803 and the UL jamming signal pattern field 804 from the base station 510. The user terminal 520 may confirm the pattern of the jamming sequence included in the DL transmission signal based on the DL jamming signal pattern field 803. The user terminal 520 may confirm the pattern of the jamming sequence included in the UL transmission signal based on the UL jamming signal pattern field 804.

The base station 510 may transmit the jamming signal length information to the user terminal 520 (S506). The jamming signal length information may include the DL jamming signal length field 805 and the UL jamming signal length field 806. The user terminal 520 may receive the DL jamming signal length field 805 and the UL jamming signal length field 806 from the base station 510. The user terminal 520 may confirm the length of the jamming sequence included in the UL transmission signal based on the DL jamming signal length field 805. The user terminal 520 may confirm the length of the jamming sequence included in the DL transmission signal based on the UL jamming signal length field 806.

After receiving the DL jamming signal length field 805 and the UL jamming signal length field 806, the user terminal 520 may transmit a response (ACK) message to the base station 510 (S507). The base station 510 may receive the response message from the user terminal 520.

The user terminal 520 may generate the UL transmission signal based on the information 800 indicating the jamming sequence and the pattern received from the base station 510. A method of generating a transmission signal including a jamming sequence will be described with reference to FIGS. 9 to 12. First, an operation of generating a transmission signal including a jamming sequence in the time domain will be described with reference to FIG. 9.

Figure 9:
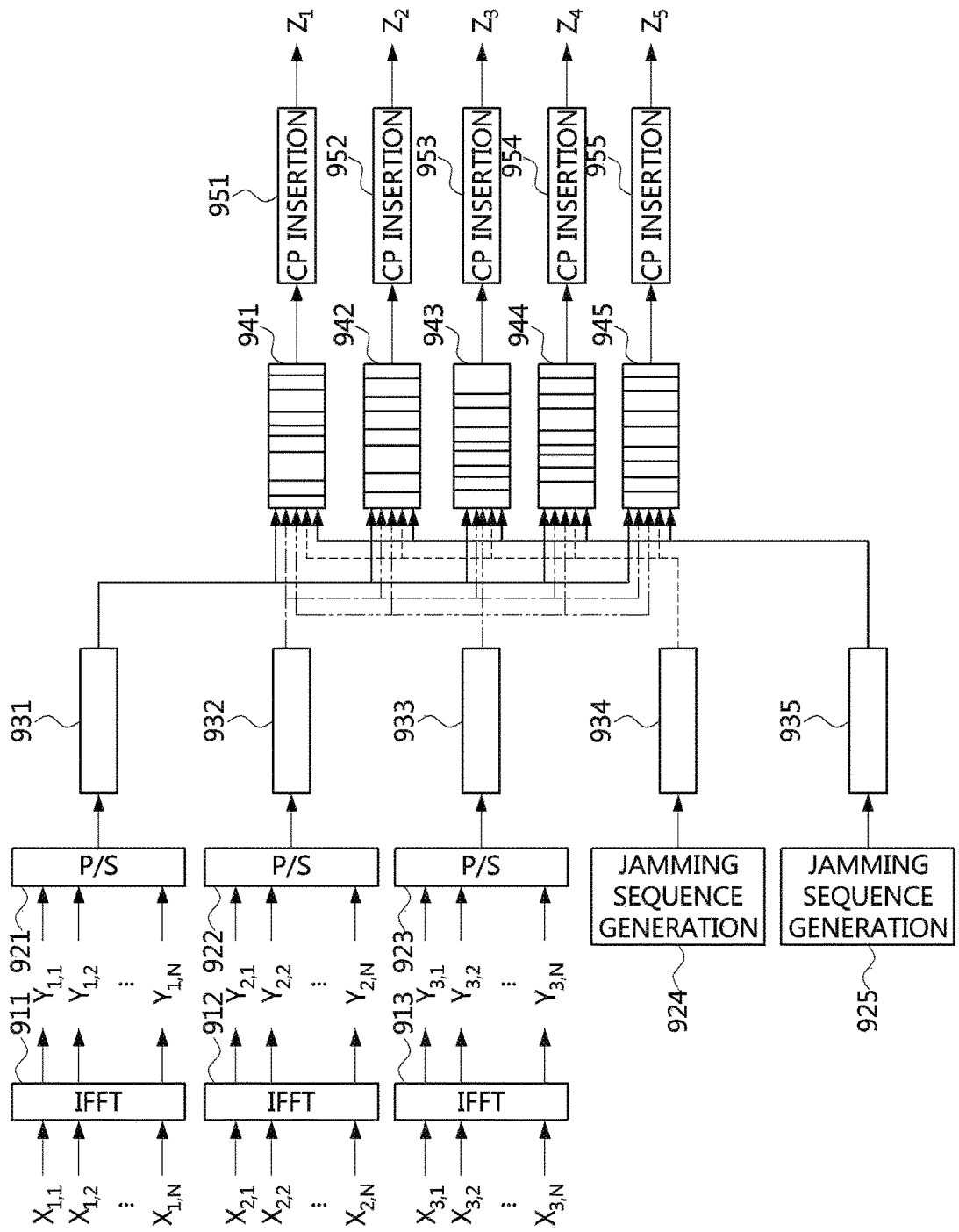
FIG. 9 is a conceptual diagram illustrating a method of generating a transmission signal including a jamming signal in the time domain of radio resources in a wireless communication system according to a second embodiment of the present disclosure.

FIG. 9 is a conceptual diagram illustrating a method of generating a transmission signal including a jamming signal in the time domain of radio resources in a wireless communication system according to a second embodiment of the present disclosure.

Referring to FIG. 9, a ratio of DL data traffic to UL data traffic may be 5:3. That is, 60% of resources for UL transmission may be allocated for the UL data traffic, and the remaining 40% of resources may not be used. Here, the remaining unused 40% of the resources may be used for the jamming sequence.

The user terminal 520 may generate a plurality of subcarrier signals in the frequency domain. For example, the user terminal 520 may generate subcarrier signals $X_{1,1}$ to $X_{1,N}$, subcarrier signals $X_{2,1}$ to $X_{2,N}$, and $X_{3,1}$ to $X_{3,N}$ subcarrier signals. Here, N may mean the number of subcarriers.

The user terminal 520 may perform inverse fast Fourier transform (IFFT) on the subcarrier signals. For example, the user terminal 520 may perform a first IFFT 911 on the subcarrier signals $X_{1,1}$ to $X_{1,N}$. The subcarrier signals $X_{1,1}$ to $X_{1,N}$ on which the first IFFT 911 has been performed may be represented by $Y_{1,1}$ to $Y_{1,N}$. The user terminal 520 may perform a second IFFT 912 on the subcarrier signals $X_{2,1}$ to $X_{2,N}$. The subcarrier signals $X_{2,1}$ to $X_{2,N}$ on which the second IFFT 912 has been performed may be represented by $Y_{2,1}$ to $Y_{2,N}$. The user terminal 520 may perform a third IFFT 913 on the subcarrier signals $X_{3,1}$ to $X_{3,N}$. The subcarrier signals $X_{3,1}$ to $X_{3,N}$ on which the third IFFT 913 has been performed may be represented by $Y_{3,1}$ to $Y_{3,N}$.

The user terminal 520 may perform a first parallel-to-serial (P/S) conversion 921 on the subcarrier signals $Y_{1,1}$ to $Y_{1,N}$. The first P/S converted signal may be referred to as a first converted signal 931. The user terminal 520 may perform a second P/S conversion 922 on the subcarrier signals $Y_{2,1}$ to $Y_{2,N}$. The second P/S converted signal may be referred to as a second converted signal 932. The user terminal 520 may perform a third P/S conversion 923 on the subcarrier signals $Y_{3,1}$ to $Y_{3,N}$. The third P/S converted signal may be referred to as a third converted signal 933.

Here, the user terminal 520 may generate a first jamming sequence and a second jamming sequence having the same length as the first to third converted signals 931 to 933 (924 and 925). For example, the user terminal 520 may generate a first jamming sequence 934 and a second jamming sequence 935 based on the UL jamming signal field 802 of FIG. 8.

The user terminal 520 may mix the P/S converted signals 931 to 933 with the jamming sequences 934 and 935 to generate time domain transmission signals. For example, the user terminal 520 may mix the converted signals 931 to 933 and the jamming signals 934 and 935 according to the pattern indicated by the UL jamming signal pattern field 804 to generate 5 time domain transmission signals 941 to 945.

The user terminal 520 may insert cyclic prefixes (CPs) for the 5 time domain transmission signals 941 to 945. For example, the user terminal 520 may insert a first CP 951 in the first time domain transmission signal 941 to generate a first OFDM symbol $Z_1$. The user terminal 520 may insert a second CP 952 in the second time domain transmission signal 942 to generate a second OFDM symbol $Z_2$. The user terminal 520 may insert a third CP 953 in the third time domain transmission signal 943 to generate a third OFDM symbol $Z_3$. The user terminal 520 may insert a fourth CP 954 in the fourth time domain transmission signal 944 to generate a fourth OFDM symbol $Z_4$. The user terminal 520 may insert a fifth CP 955 in the fifth time domain transmission signal 945 to generate a fifth OFDM symbol $Z_5$.

The user terminal 520 may generate a transmission signal including a jamming sequence in the frequency domain not in the time domain. An operation of generating a transmission signal including a jamming sequence in the frequency domain will be described with reference to FIG. 10.

Figure 10:
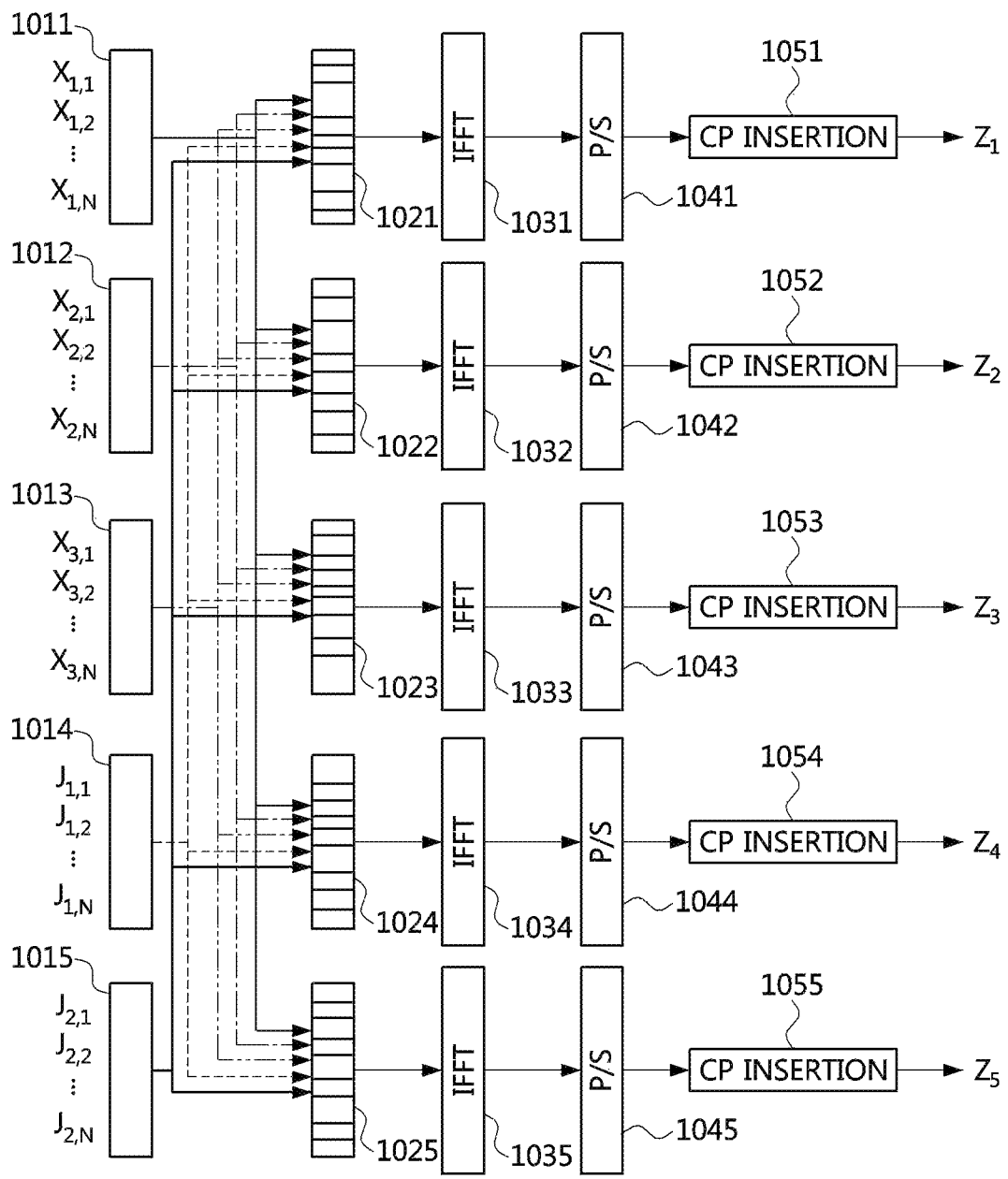
FIG. 10 is a conceptual diagram illustrating a method of generating a transmission signal including a jamming signal in the frequency domain of radio resources in a wireless communication system according to a second embodiment of the present disclosure.

FIG. 10 is a conceptual diagram illustrating a method of generating a transmission signal including a jamming signal in the frequency domain of radio resources in a wireless communication system according to a second embodiment of the present disclosure.

Referring to FIG. 10, a ratio of DL traffic to UL traffic may be 5:3. That is, 60% of resources for UL transmission may be allocated for the UL traffic, and the remaining 40% of resources may not be used. Here, the remaining unused 40% of the resources may be used for the jamming sequence.

The user terminal 520 may generate a plurality of subcarrier signals in the frequency domain. For example, the user terminal 520 may generate subcarrier signals $X_{1,1}$ to $X_{1,N}$ 1011, subcarrier signals $X_{2,1}$ to $X_{2,N}$ 1012, and subcarrier signals $X_{3,1}$ to $X_{3,N}$ 1013. Here, N may mean the number of subcarriers.

Here, the user terminal 520 may also generate a first jamming sequence 1014 and a second jamming sequence 1015 in the frequency domain. The first jamming sequence 1014 may include subcarrier signals $J_{1,1}$ to $J_{1,N}$. The second jamming sequence 1015 may include subcarrier signals $J_{2,1}$ to $J_{2,N}$. The user terminal 520 may generate the first jamming sequence 1014 and the second jamming sequence 1015 based on the UL jamming signal field 802 of FIG. 8.

The user terminal 520 may generate 5 frequency domain signals 1021 to 1025 by mixing the subcarrier signals 1011 to 1013, the first jamming sequence 1014, and the second jamming sequence 1015 according to the pattern indicated by the UL jamming signal pattern field 804 of FIG. 8.

The user terminal 520 may perform IFFT on the 5 frequency domain signals 1021 to 1025. For example, the user terminal 520 may perform a first IFFT 1031 on the first frequency domain signal 1021. The user terminal 520 may perform a second IFFT 1032 on the second frequency domain signal 1022. The user terminal 520 may perform a third IFFT 1033 on the third frequency domain signal 1023. The user terminal 520 may perform a fourth IFFT 1034 on the fourth frequency domain signal 1024. The user terminal 520 may perform a fifth IFFT 1035 on the fifth frequency domain signal 1025.

The user terminal 520 may perform P/S conversion on the IFFT output signals. For example, the user terminal 520 may perform a first P/S conversion 1041 on the output signal of the first IFFT 1031. The user terminal 520 may perform a second P/S conversion 1042 on the output signal of the second IFFT 1032. The user terminal 520 may perform a third P/S conversion 1043 on the output signal of the third IFFT 1033. The user terminal 520 may perform a fourth P/S conversion 1044 on the output signal of the fourth IFFT 1034. The user terminal 520 may perform a fifth P/S conversion 1045 on the output signal of the fifth IFFT 1035.

The user terminal 520 may insert CPs into the P/S converted signals to generate an OFDM transmission signal. For example, the user terminal 520 may insert a first CP 1051 in a first P/S converted signal to generate a first OFDM transmission symbol $Z_1$. The user terminal 520 may insert a second CP 1052 in a second P/S converted signal to generate a second OFDM transmission symbol $Z_2$. The user terminal 520 may insert a third CP 1053 in a third P/S converted signal to generate a third OFDM transmission symbol $Z_3$. The user terminal 520 may insert a fourth CP 1054 in a fourth P/S converted signal to generate a fourth OFDM transmission symbol $Z_4$. The user terminal 520 may insert a fifth CP 1055 in a fifth P/S converted signal to generate a fifth OFDM transmission symbol $Z_5$.

The user terminal 520 may generate a transmission signal including a jamming sequence in the frequency domain and the time domain. An operation of generating a transmission signal including a jamming sequence in the frequency domain and the time domain will be described with reference to FIG. 11.

Figure 11:
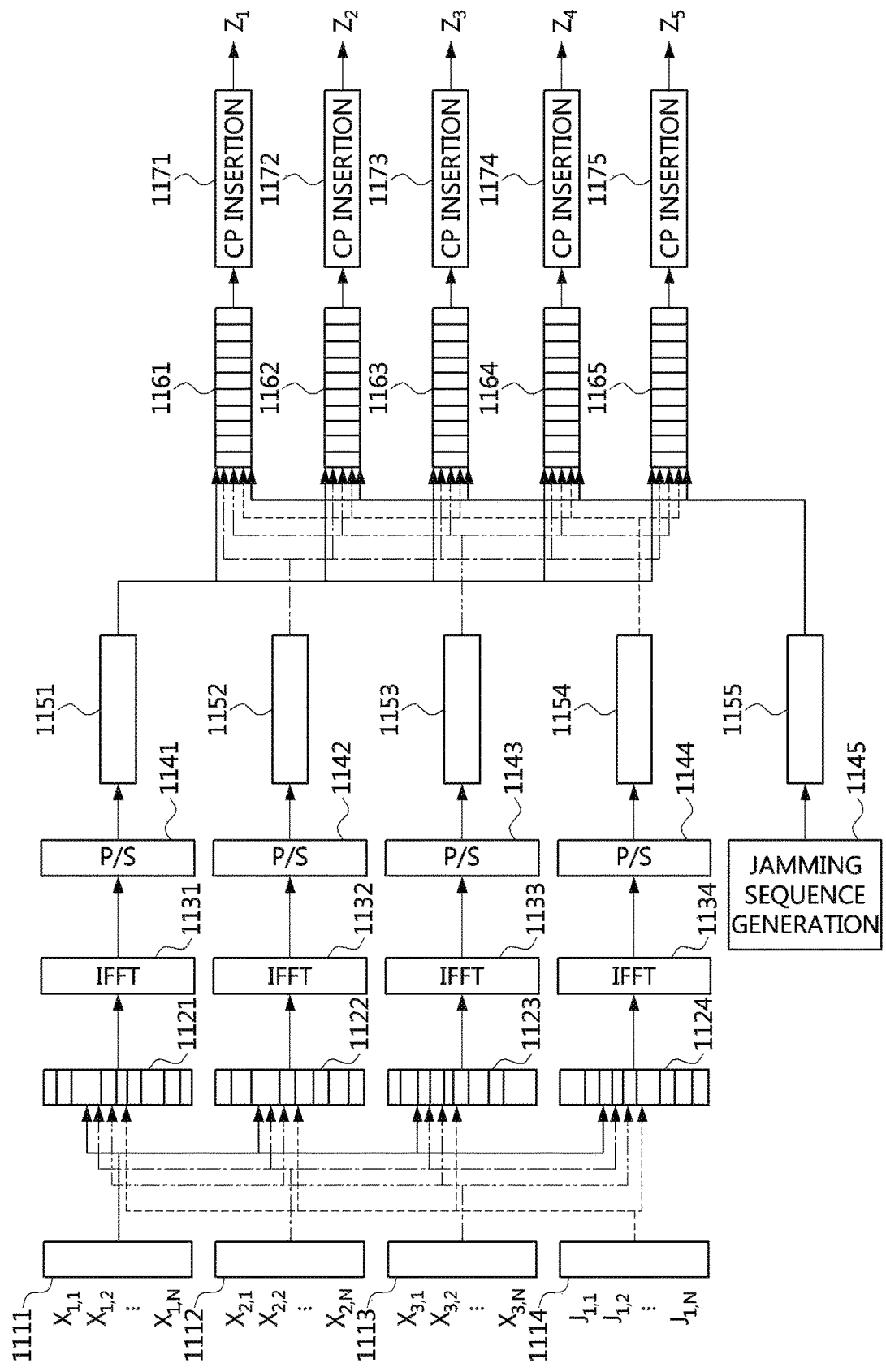
FIG. 11 is a conceptual diagram illustrating a method of generating a transmission signal including a jamming signal in the frequency domain and the time domain of radio resources in a wireless communication system according to a second embodiment of the present disclosure.

FIG. 11 is a conceptual diagram illustrating a method of generating a transmission signal including a jamming signal in the frequency domain and the time domain of radio resources in a wireless communication system according to a second embodiment of the present disclosure.

Referring to FIG. 11, a ratio of DL traffic to UL traffic may be 5:3. That is, 60% of resources for UL transmission may be allocated for the UL traffic, and the remaining 40% of resources may not be used. Here, the remaining unused 40% of the resources may be used for the jamming sequence.

The user terminal 520 may generate a plurality of subcarrier signals in the frequency domain. For example, the user terminal 520 may generate subcarrier signals $X_{1,1}$ to $X_{1,N}$ 1111, subcarrier signals $X_{2,1}$ to $X_{2,N}$ 1112, and subcarrier signals $X_{3,1}$ to $X_{3,N}$ 1113. Here, N may mean the number of subcarriers.

Here, the user terminal 520 may generate a first jamming sequence 1114 in the frequency domain. The first jamming sequence 1114 may include subcarrier signals $J_{1,1}$ to $J_{1,N}$. For example, the user terminal 520 may generate the first jamming sequence 1114 based on the UL jamming signal field 802 of FIG. 8.

The user terminal 520 mat mix the subcarrier signals 1111 to 1113 and the first jamming sequence 1114. For example, the user terminal 520 may generate 4 frequency domain signals 1121 to 1124 by mixing the subcarrier signals 1111 to 1113 and the first jamming sequence 1114 according to the pattern indicated by the UL jamming signal pattern field 804 of FIG. 8.

The user terminal 520 may perform IFFT on the 4 frequency domain signals 1121 to 1124. For example, the user terminal 520 may perform a first IFFT 1131 on the first frequency domain signal 1121. The user terminal 520 may perform a second IFFT 1132 on the second frequency domain signal 1122. The user terminal 520 may perform a third IFFT 1133 on the third frequency domain signal 1123. The user terminal 520 may perform a fourth IFFT 1134 on the fourth frequency domain signal 1124.

The user terminal 520 may perform P/S conversion on the IFFT output signals. For example, the user terminal 520 may perform a first P/S conversion 1141 on the output signal of the first IFFT 1131. The user terminal 520 may perform a second P/S conversion 1142 on the output signal of the second IFFT 1132. The user terminal 520 may perform a third P/S conversion 1143 on the output signal of the third IFFT 1133. The user terminal 520 may perform a fourth P/S conversion 1144 on the output signal of the fourth IFFT 1134.

Here, the user terminal 520 may generate a second jamming sequence having the same length as the first to third P/S converted signals 1141 to 1144 (1145). For example, the user terminal 520 may generate the second jamming sequence 1155 based on the LTL jamming signal field 802 of FIG. 8.

The user terminal 520 mat mix the first to fourth P/S converted signals 1141 to 1144 and the second jamming sequence 1155. For example, the user terminal 520 may generate 5 time domain signals 1161 to 1165 by mixing the first to fourth P/S converted signals 1141 to 1144 and the second jamming sequence 1155 according to the pattern indicated by the LTL jamming signal pattern field 804 of FIG. 8.

The user terminal 520 may insert CPs into the 5 time domain transmission signals 1161 to 1165. For example, the user terminal 520 may insert a first CP 1171 in the first time domain signal 1161 to generate a first OFDM symbol $Z_1$. The user terminal 520 may insert a second CP 1172 in the second time domain signal 1162 to generate a second OFDM symbol $Z_2$. The user terminal 520 may insert a third CP 1173 in the third time domain signal 1163 to generate a third OFDM symbol $Z_3$. The user terminal 520 may insert a fourth CP 1174 in the fourth time domain signal 1164 to generate a second OFDM symbol $Z_4$. The user terminal 520 may insert a fifth CP 1175 in the fifth time domain signal 1165 to generate a fifth OFDM symbol $Z_5$.

Referring again to FIG. 5, when the response message is received from the user terminal 520, the base station 510 may receive a UL data packet from the user terminal via the UL (S509) at the same time of transmitting a DL data packet to the user terminal via the DL (S508). Likewise, the user terminal 520 may transmit the UL data packet to the base station 510 via the UL (S509) and simultaneously receive the DL data packet from the base station 510 via the DL (S508).

For example, the user terminal 520 may transmit the UL data packet including the first to fifth OFDM symbols $Z_1$ to $Z_5$ of FIG. 9, the first to fifth OFDM symbols $Z_1$ to $Z_5$ of FIG. 10, or the first to fifth OFDM symbols $Z_1$ to $Z_5$ of FIG. 11 to the base station 510 via the UL. The base station 510 may receive the UL data packet including the first through fifth OFDM symbols $Z_1$ to $Z_5$ from the user terminal 520 via the UL.

The UL data packet transmitted from the base station 510, the UL data packet transmitted from the user terminal 520, and signals received by the eavesdropper terminal 530 will be described with reference to FIG. 12.

Figure 12:
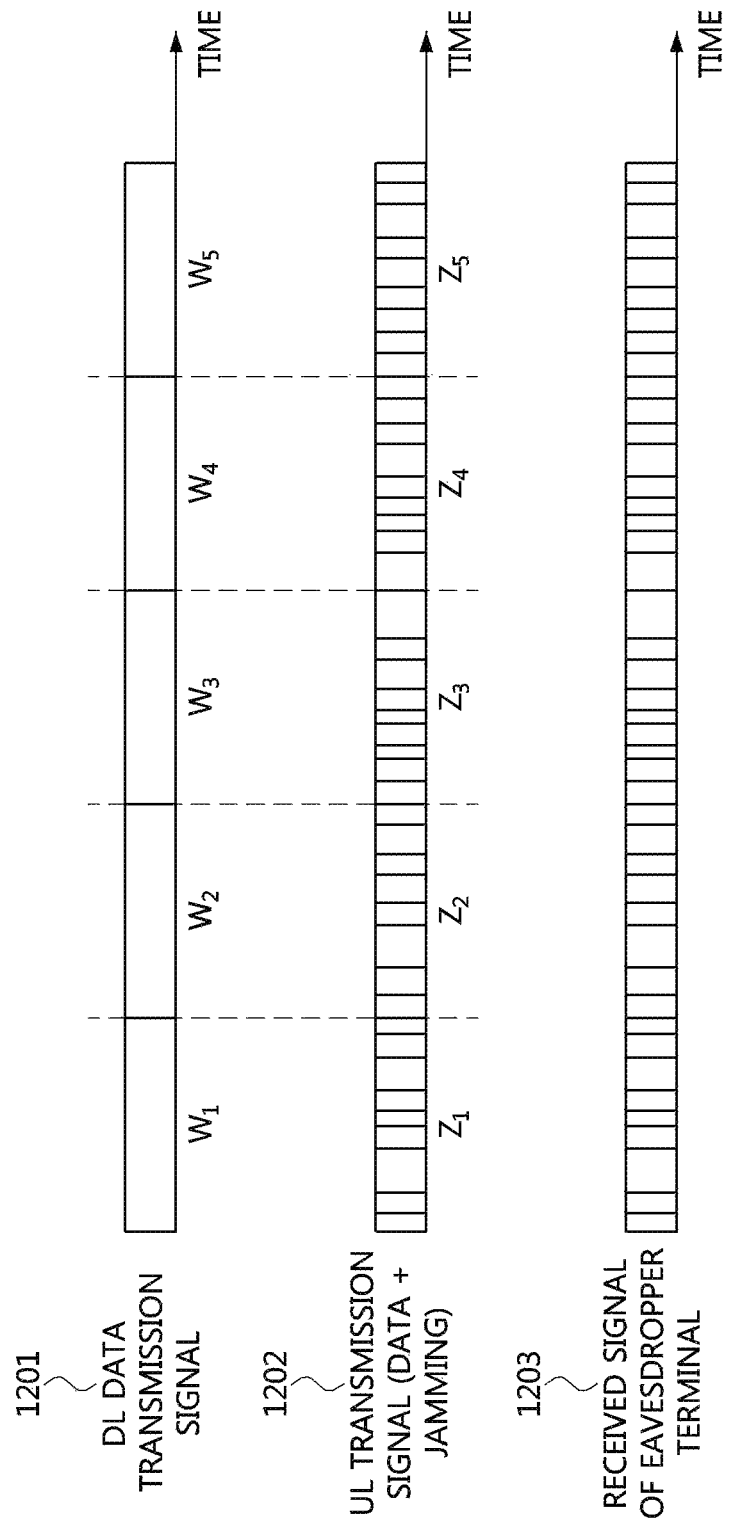
FIG. 12 is a conceptual diagram illustrating a DL data transmission signal, a UL data transmission signal, and a reception signal received by an eavesdropper terminal according to a second embodiment of the present disclosure.

FIG. 12 is a conceptual diagram illustrating a DL data transmission signal, a UL data transmission signal, and a reception signal received by an eavesdropper terminal according to a second embodiment of the present disclosure.

Referring to FIG. 12, the DL data transmission signal 1201 and the UL data transmission signal 1202 may be simultaneously transmitted through the same frequency band. The DL data transmission signal 1201 may include first to fifth DL symbols $W_1$ to $W_5$. Also, the UL data transmission signal 1202 may include first to fifth UL symbols $Z_1$ to $Z_5$.

Here, the first to fifth UL symbols $Z_1$ to $Z_5$ may include a jamming signal. Here, the first to fifth UL symbols $Z_1$ to $Z_5$ may be the same as or similar to the first to fifth OFDM symbols $Z_1$ to $Z_5$ of FIG. 9, the first to fifth OFDM symbols $Z_1$ to $Z_5$ of FIG. 10, or the first to fifth OFDM symbols $Z_1$ to $Z_5$ of FIG. 11. In this case, since the DL data transmission signal 1201 uses all the given resources for data transmission, the data transmission rate can be maximized.

In the reception signal 1203 received by the eavesdropper terminal 530, the DL data transmission signal 1201 and the UL data transmission signal 1202 are mixed. Also, the eavesdropper terminal 530 may not know the pattern of the jamming sequence included in the UL data transmission signal 1202. Thus, the eavesdropper terminal 530 cannot eavesdrop on the DL data transmission signal 1201 and the UL data transmission signal 1202.

Figure 13:
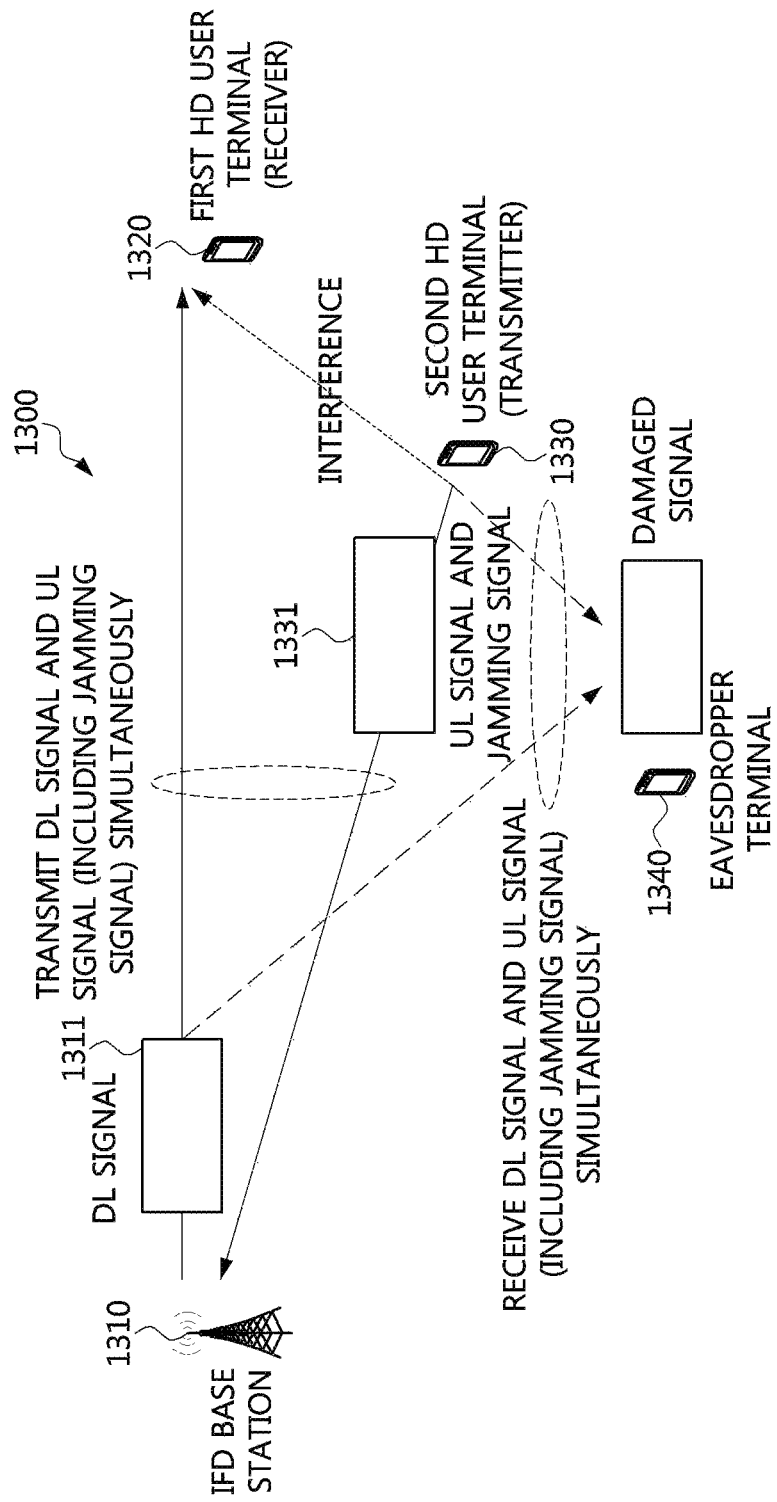
FIG. 13 is a conceptual diagram illustrating a wireless communication system based on an IFD scheme according to a third embodiment of the present disclosure.

FIG. 13 is a conceptual diagram illustrating a wireless communication system based on an IFD scheme according to a third embodiment of the present disclosure.

Referring to FIG. 13, a wireless communication system 1300 may comprise an IFD base station 1310 operating in an IFD manner, a first half-duplex (HD) user terminal 1320 and a second HD user terminal 1330 operating in an HD mode, and a eavesdropper terminal 1340. Here, the wireless communication system 1300 may be the same as or similar to the wireless communication system 400 of FIG. 4. The first HD user terminal 1320 and the second HD user terminal 1330 may be the same as or similar to the user terminal 420 of FIG. 4. Also, the eavesdropper terminal 1340 may be the same as or similar to the eavesdropper terminal 430 of FIG. 4.

The IFD base station 1310 may transmit a DL transmission signal 1311 to the first HD user terminal 1320. At the same time, the IFD base station 410 may receive a UL transmission signal 1331 including a jamming signal from the second HD user terminal 1330 through the same frequency band as the frequency band in which the DL transmission signal 411 is transmitted.

That is, the first HD user terminal 1320 may receive the DL transmission signal 1311 from the IFD base station 1310. At the same time, the second HD user terminal 1330 may transmit the UL transmission signal 1331 including a jamming signal to the IFD base station 1310 through the same frequency band in which the DL transmission signal 1311 is transmitted. In other words, the DL transmission signal 1311 and the UL transmission signal 1331 may be simultaneously transmitted in the same frequency band. The IFD base station 1310 in the IFD wireless communication system 1300 may simultaneously transmit and receive signals in the same frequency band. Therefore, the data transmission rates of UL and DL in the IFD wireless communication system 1300 can be improved.

Here, the eavesdropper terminal 1340 may simultaneously receive the DL transmission signal 1311 and the LTL transmission signal 1331. The signal received by the eavesdropper terminal 1340 may be a mixture of the DL transmission signal 1311 and the UL transmission signal 1331. That is, the DL transmission signal 1311 and the UL transmission signal 1331 of the signal received by the eavesdropper terminal 1340 may act as a jamming signal to protect each other. Also, when the size of the DL data traffic is smaller than the size of the UL data traffic, the IFD base station 1310 may improve the security by transmitting an additional jamming signal or artificial noise using the remaining resources. Likewise, when the size of the UL data traffic is smaller than the size of the DL data traffic, the first HD user terminal 1320 and the second HD user terminal 1330 may transmit additional jamming signals or artificial noises using the remaining resources so that the security can be improved.

A physical layer security communication procedure between the IFD base station 1310, the first HD user terminal 1320, and the second HD user terminal 1330 using the jamming signal will be described with reference to FIG. 14.

Figure 14:
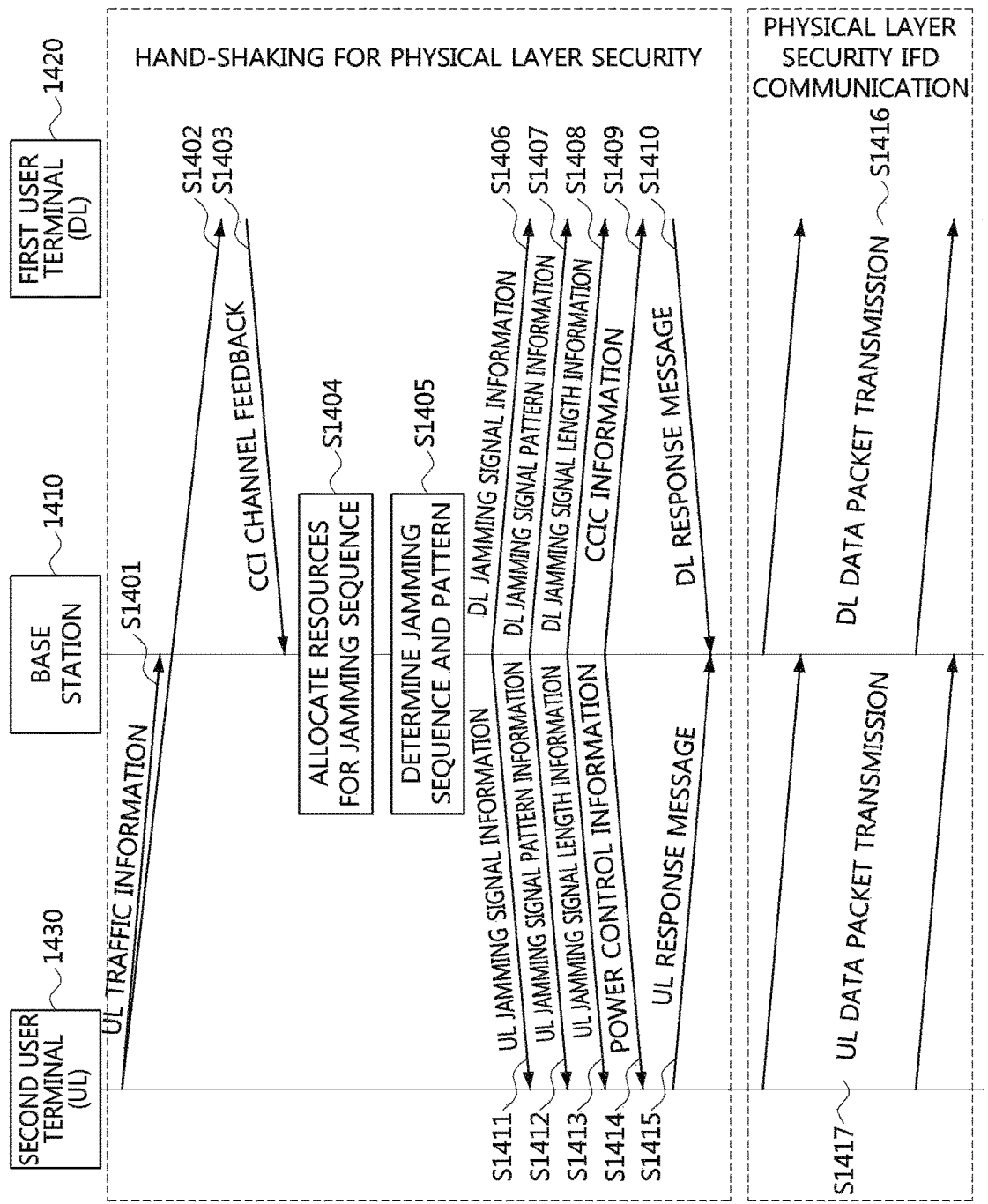
FIG. 14 is a sequence chart illustrating a flow of signals transmitted and received between a base station and a terminal in a wireless communication system according to a third embodiment of the present disclosure.

FIG. 14 is a sequence chart illustrating a flow of signals transmitted and received between a base station and a terminal in a wireless communication system according to a third embodiment of the present disclosure.

Referring to FIG. 14, the wireless communication system may be an LTE system. Here, the procedure of FIG. 14 may be included in an RRC connection establishment procedure. Also, it is assumed that the LTE system can support the IFD scheme.

A second user terminal 1430 may transmit UL traffic information to a base station 1410 (S1401). The UL traffic information may include information on UL data traffic that the second user terminal 1430 desires to transmit through the UL. The UL traffic information may be included in an RRC connection request message. Also, a control message for determining whether to use the UL traffic information may be used.

In this case, the UL traffic information may be transmitted to the first user terminal 1420 as well as the base station 1410 (S1402). Accordingly, the first user terminal 1420 may include a separate field for interference channel estimation in the UL traffic information. For example, a structure of the UL traffic information may be as shown in FIG. 15.

Figure 15:
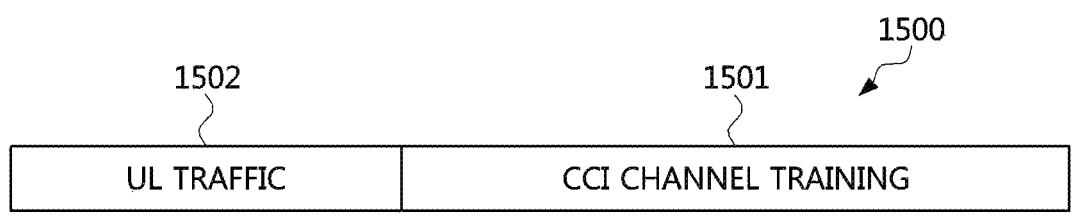
FIG. 15 is a conceptual diagram illustrating a structure of UL traffic information used in a wireless communication system according to a third embodiment of the present disclosure.

FIG. 15 is a conceptual diagram illustrating a structure of UL traffic information used in a wireless communication system according to a third embodiment of the present disclosure.

Referring to FIG. 15, UL traffic information 1500 may include a co-channel interference (CCI) channel training field 1501 and a UL traffic field 1502. Here, the CCI channel training field 1501 may be a field for estimating a CCI. The CCI channel training field 1501 may be an optional field. The UL traffic field 1502 may be a mandatory field.

Referring again to FIG. 14, the first user terminal 1420 may receive the UL traffic information from the second user terminal 1410 (S1402). The first user terminal 1420 may estimate a CCI channel using the CCI channel training field 1501 included in the UL traffic information received from the second user terminal 1410. The first user terminal 1420 may generate a CCI channel feedback message including information on the result of estimating the CCI channel.

The first user terminal 1420 may transmit the CCI channel feedback message to the base station 1410 (S1403). The base station 1410 may receive the CCI channel feedback message from the first user terminal 1420. Here, the CCI channel feedback message may be selectively transmitted by the first user terminal 1420.

The base station 1410 may allocate resources for a jamming sequence based on the UL traffic information received from the second user terminal 1430 (S1404). For example, the base station 1410 may confirm the size of the UL data traffic required by the second user terminal 1420 based on the UL traffic information received from the second user terminal 1420. The base station 1410 may compare the size of the UL data traffic required by the second user terminal 1420 with the size of the DL data traffic that the base station 1410 desires to transmit through the DL. The base station 1410 may determine the number of symbols for transmitting simultaneously in UL and DL in the same frequency band based on the size of the UL data traffic and the size of the DL data traffic required.

The base station 1410 may determine a jamming sequence and a jamming sequence pattern based on the determined number of symbols (S1405). An operation of the base station 1410 for determining the jamming sequence and pattern may be the same as or similar to the operation described with respect to FIGS. 6 to 11.

Also, the base station 1410 may perform a resource allocation operation to maximize the overall throughput of the wireless communication system based on the CCI channel feedback message received from the first user terminal 1420. The base station 1410 may also control interference to the first user terminal 1420 based on the CCI channel feedback message received from the first user terminal 1420. For example, the base station 1410 may determine whether the first user terminal 1420 performs an interference cancellation operation based on the CCI channel feedback message. Also, the base station 1410 may determine a power level per subcarrier of the UL transmission signal transmitted by the second user terminal 1430 based on the CCI channel feedback message.

The base station 1410 may then transmit information indicating a DL jamming sequence and a DL jamming sequence pattern to the first user terminal 1420. Also, the base station 1410 may transmit information indicating a UL jamming sequence and a UL jamming sequence pattern to the second user terminal 1430. The information indicating the DL jamming sequence and the pattern will be described with reference to FIG. 16A. The information indicating the UL jamming sequence and the pattern will be described with reference to FIG. 16B.

Figure 16A:
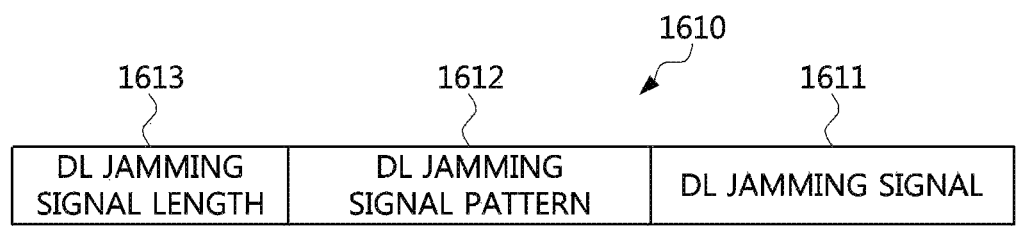
FIGS. 16A and 16B are conceptual diagrams illustrating information indicating a jamming sequence and a jamming sequence pattern in a wireless communication system according to a third embodiment of the present disclosure.
Figure 16B:
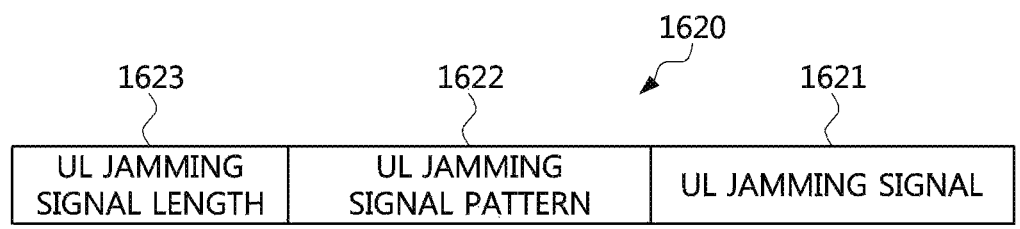

FIGS. 16A and 16B are conceptual diagrams illustrating information indicating a jamming sequence and a jamming sequence pattern in a wireless communication system according to a third embodiment of the present disclosure.

Referring to FIG. 16A, DL jamming signal information 1610 indicating the DL jamming sequence and the pattern may include a DL jamming signal field 1611, a DL jamming signal pattern field 1612, and a DL jamming signal length field 1613. The DL jamming signal field 1611 may be the same as or similar to the DL jamming signal field 801 of FIG. 8. The DL jamming signal pattern field 1612 may be the same as or similar to the DL jamming signal pattern field 803 of FIG. 8. The DL jamming signal length field 1613 may be the same as or similar to the DL jamming signal length field 805 of FIG. 8.

Referring to FIG. 16B, UL jamming signal information 1620 indicating the UL jamming sequence and the pattern may include a UL jamming signal field 1621, a UL jamming signal pattern field 1622, and a LTL jamming signal length field 1623. The UL jamming signal field 1621 may be the same as or similar to the UL jamming signal field 802 of FIG. 8. The LTL jamming signal pattern field 1622 may be the same as or similar to the UL jamming signal pattern field 804 of FIG. 8. The UL jamming signal length field 1623 may be the same as or similar to the UL jamming signal length field 806 of FIG. 8.

Referring again to FIG. 14, the base station 1410 may transmit the DL jamming signal field 1611 to the first user terminal 1420 (S1406). The first user terminal 1420 may receive the DL jamming signal field 1611 from the base station 1410. The first user terminal 1420 may confirm whether a jamming sequence is inserted in the DL transmission signal based on the DL jamming signal field 1611 received from the base station 1410. The DL jamming signal field 1611 may be an optional field.

The base station 1410 may transmit the DL jamming signal pattern field 1612 to the first user terminal 1420 (S1407). The first user terminal 1420 may receive the DL jamming signal pattern field 1612 from the base station 1410. The first user terminal 1420 may confirm the pattern of the jamming sequence included in the DL transmission signal based on the DL jamming signal pattern field 1612.

The base station 1410 may transmit the DL jamming signal length field 1613 to the first user terminal 1420 (S1408). The first user terminal 1420 may receive the DL jamming signal length field 1613 from the base station 1410. The first user terminal 1420 may confirm the length of the jamming sequence included in the DL transmission signal based on the DL jamming signal length field 1613.

The base station 1410 may transmit CCIC information to the first user terminal 1420 (S1409). The first user terminal 1420 may receive the CCIC information from the base station 1410. Here, the CCIC information may be selectively transmitted by the base station 1410.

For example, the base station 1410 may generate the CCIC information indicating whether the first user terminal 1420 performs an interference cancellation operation based on the CCI channel feedback message received from the first user terminal 1420. The CCIC information may have a value of zero or one. Here, the value '0' may indicate that the interference cancellation operation is to be performed in the first terminal. Also, the value '1' may indicate not to perform the interference cancellation operation in the first terminal.

The first user terminal 1420 may perform an operation to cancel an interference signal caused by the second user terminal 1430 based on the result of estimating the CCI when the CCIC information has the value of '0'. On the other hand, when the CCIC information has the value of '1', the first user terminal 1420 may not perform the operation to cancel an interference signal.

After receiving the CCIC information, the first user terminal 1420 may transmit a response (ACK) message to the base station 1410 (S1410). The base station 510 may receive the response message from the first user terminal 1420.

Meanwhile, the base station 1410 may transmit the UL jamming signal field 1621 to the second user terminal 1420 (S1411). The second user terminal 1420 may receive the UL jamming signal field 1621 from the base station 1410. The second user terminal 1430 may confirm whether the jamming sequence is inserted in the UL transmission signal based on the UL jamming signal field 1621 received from the base station 1410. The UL jamming signal field 1621 may be selectively used.

The base station 1410 may transmit the UL jamming signal pattern field 1622 to the second user terminal 1430 (S1412). The second user terminal 1430 may receive the LTL jamming signal pattern field 1622 from the base station 1410. The second user terminal 1430 may confirm the pattern of the jamming sequence included in the UL transmission signal based on the UL jamming signal pattern field 1622.

The base station 1410 may transmit the UL jamming signal length field 1623 to the second user terminal 1430 (S1413). The second user terminal 1430 may receive the UL jamming signal length field 1623 from the base station 1410. The second user terminal 1430 may confirm the length of the jamming sequence included in the UL transmission symbols based on the UL jamming signal length field 1623.

The base station 1410 may transmit power control information to the second user terminal 1430 (S1414). Here, the power control information may be selectively transmitted by the base station 1410. For example, the base station 1410 may generate the power control information based on the CCI channel feedback message received from the first user terminal 1420. The power control information may indicate the size of the power per subcarrier of the UL transmission signal transmitted by the second user terminal 1430.

The second user terminal 1430 may receive the power control information from the base station 1410. The second user terminal 1430 may control the power per subcarrier of the UL transmission signal based on the power control information.

After receiving the power control information, the second user terminal 1430 may transmit a response message to the base station 1410 (S1415). The base station 1410 may receive the response message from the second user terminal 1430.

The second user terminal 1430 may generate the UL data packet based on the information 1610 indicating the jamming sequence and pattern received from the base station 1410. A method of generating the UL data packet including the jamming sequence may be the same as or similar to the method described with reference to FIGS. 9 to 12.

The base station 1410 may transmit the DL data packet to the first user terminal 1420 via the DL (S1416). At the same time, the base station 1410 may receive the UL data packet from the second user terminal 1430 via the UL in the same frequency band as the frequency band in which the DL data packet is transmitted (S1417).

In other words, the first user terminal 1420 may receive the DL data packet from the base station 1410 via the DL. At this time, the second user terminal 1430 may transmit the UL data packet to the base station 1410 via the UL in the same frequency band as the frequency band in which the DL data packet is transmitted. That is, the DL data packet and the UL data packet may be simultaneously transmitted in the same frequency band.

A structure of a transceiver included in the base station 1410, the first user terminal 1420, and the second user terminal 1430 will be described with reference to FIG. 17.

Figure 17:
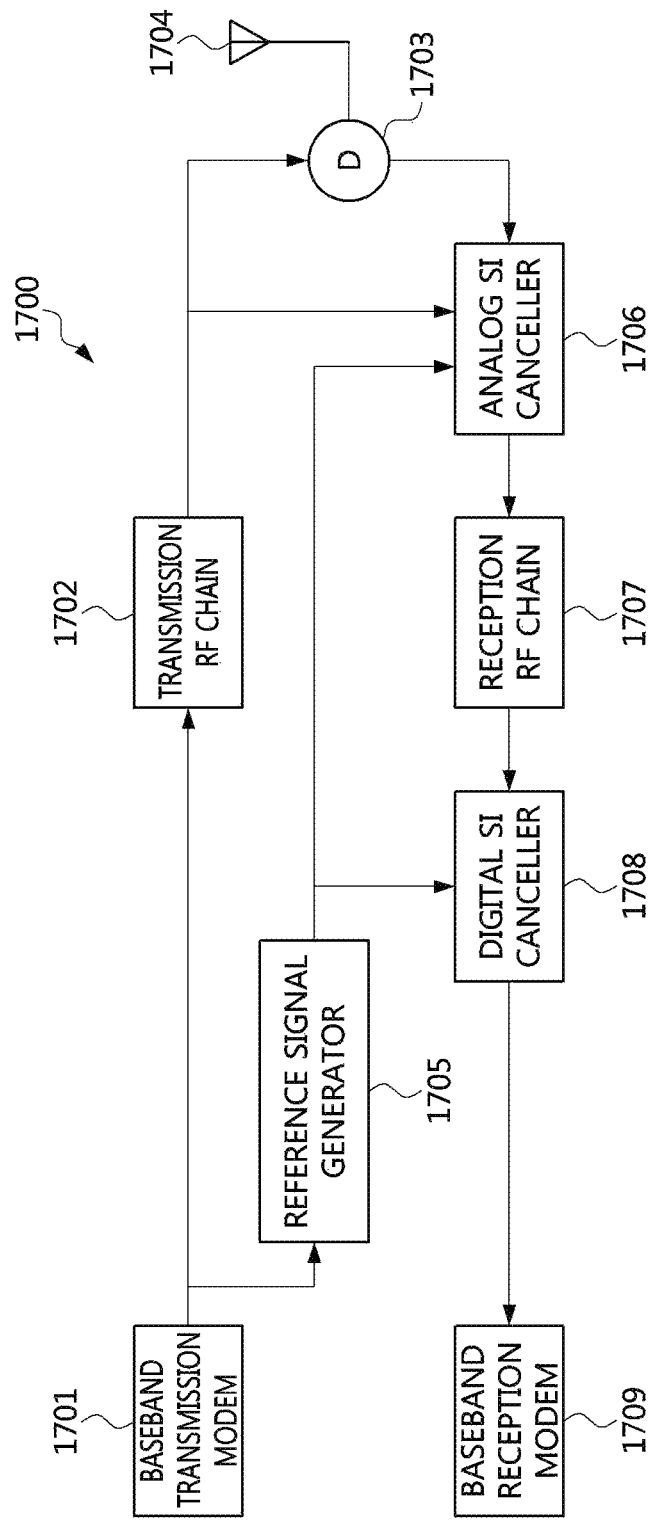
FIG. 17 is a block diagram illustrating a structure of a transceiver of a communication node according to a third embodiment of the present disclosure.

FIG. 17 is a block diagram illustrating a structure of a transceiver of a communication node according to a third embodiment of the present disclosure.

Referring to FIG. 17, a transceiver 1700 may be the transceiver 330 of FIG. 3. For example, the transceiver 1700 may comprise a baseband transmission modem 1701, a transmission radio frequency (RF) chain 1702, a distributor (denoted as CD') 1703, an antenna 1704, a reference signal generator for self-interference cancellation (SIC) 1705, an analog SI canceller 1706, a reception RF chain 1707, a digital SI canceller 1708, and a baseband reception modem 1709.

The baseband transmission modem 1701 may modulate a data signal to be transmitted into a baseband signal. The transmission RF chain 1702 may perform an RF processing on the signal modulated by the baseband transmission modem 1701.

The distributor D 1703 may separate the RF signal processed by the transmission RF chain 1702 from a reception signal received via the antenna 1704. The antenna 1704 may transmit a transmission signal. Also, the antenna 1701 may receive the reception signal in the same frequency band as the frequency band in which the transmission signal is transmitted.

The reference signal generator 1705 for the SIC may generate a reference signal using the signal modulated by the baseband transmission modem 1701. The analog SI canceller 1706 may cancel an analog self-interference signal from the reception signal separated by the distributor 1703 using the reference signal generated by the reference signal generator 1705. The reception RF chain 1707 may perform an RF processing on the reception signal from which the analog self-interference signal has been canceled by the SI canceller 1706. The digital SI canceller 1708 may cancel a digital self-interference signal from the reception signal RF-processed by the reception RF chain 1707. The baseband reception modem 1709 may demodulate the reception signal from which the digital self-interference signal has been cancelled by the digital SI canceller 1708 into a baseband signal.

Here, a specific structure of the baseband transmission modem 1701 will be described with reference to FIG. 18. Also, a structure of the baseband reception modem 1709 will be described with reference to FIG. 19.

Figure 18:
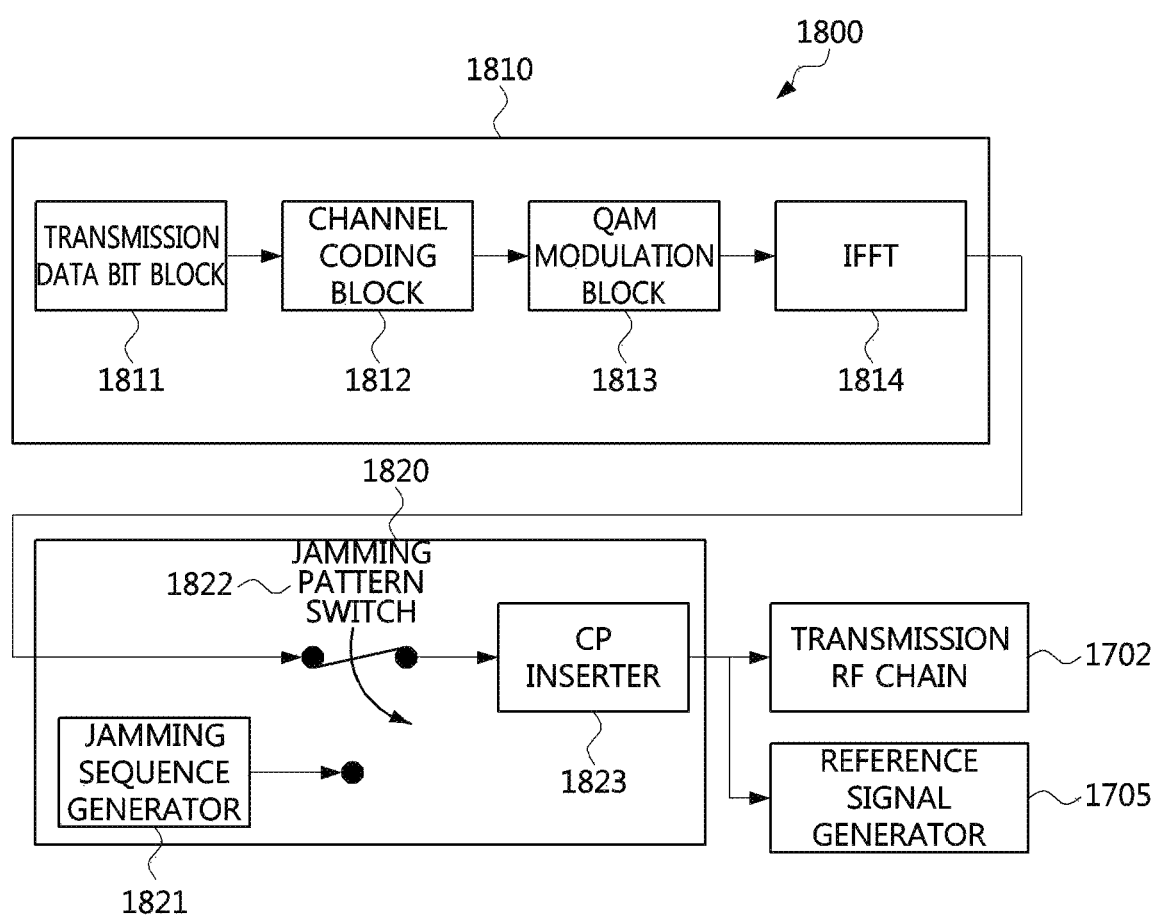
FIG. 18 is a block diagram illustrating a structure of a baseband transmission modem of a transceiver according to a third embodiment of the present disclosure.

FIG. 18 is a block diagram illustrating a structure of a baseband transmission modem of a transceiver according to a third embodiment of the present disclosure.

Referring to FIG. 18, a baseband transmission modem 1800 may be the baseband transmission modem 1701 of FIG. 17. The baseband transmission modem 1800 may comprise a modem unit 1810 and a jamming sequence insertion unit 1820.

The modem unit 1810 may include a transmission data bit block 1811, a channel coding block 1812, a quadrature amplitude modulation (QAM) modulation block 1813, and an IFFT block 1814. The jamming sequence insertion unit 1820 may include a jamming sequence generator 1821, a jamming pattern switch 1822, and a CP inserter 1823.

The transmission data bit block 1811 may generate data bits for transmission. The channel coding block 1812 may encode the data bits generated by the transmission data bit block 1811.

The QAM modulation block 1813 may modulate the data bits encoded by the channel encoding block 1812. Here, the modulation may be performed according to one of a QAM scheme, a frequency shift keying (FSK) scheme, and a phase shift keying (PSK) scheme. The signals output by the QAM modulation block 1803 may be the same as or similar to the first to third OFDM symbols in FIG. 9, the first to third OFDM symbols 1011 to 1013 in FIG. 10, or the first to third OFDM symbols 1111 to 1113 in FIG. 11.

The IFFT block 1814 may perform an IFFT on S QAM symbols generated by the QAM modulation block 1813 to generate S sample IFFT output signals. Here, S is an integer. For example, the IFFT block 1814 may perform the first to third IFFTs 911 to 913 of FIG. 9. Also, the IFFT block 1814 may perform the first to third IFFTs 1131 to 1135 of FIG. 10. Also, the IFFT block 1814 may perform the first to third IFFTs 1131 to 1135 of FIG. 11.

The jamming sequence generator 1821 may generate N to S jamming sample signals. Here, N≤S. For example, the jamming sequence generator 1821 may generate S jamming sample signals based on the DL jamming signal information 801 and the DL jamming signal length information 805 in FIG. 8. Alternatively, the jamming sequence generator 1805 may generate S jamming sample signals based on the DL jamming signal length information 802 and the UL jamming signal information 806 in FIG. 8.

Alternatively, the jamming sequence generator 1821 may generate S jamming sample signals based on the DL jamming signal information 1611 and the DL jamming signal length information 1613 in FIG. 16A. Alternatively, the jamming sequence generator 1805 may generate S jamming sample signals based on the UL jamming signal information 1621 and the UL jamming signal length information 1623 in FIG. 16B.

For example, the jamming sequence generator 1821 may generate the first jamming sequence 934 and the second jamming sequence 935 of FIG. 9. Also, the jamming sequence generator 1821 may generate the first jamming sequence 1014 and the second jamming sequence 1015 in FIG. 10. Also, the jamming sequence generator 1821 may generate the first jamming sequence 1114 and the second jamming sequence 1155 in FIG. 11.

The jamming pattern switch 1822 may insert the S jamming sample signals generated by the jamming sequence generator 1821 into the S sample IFFT output signals generated by the IFFT block 1814 according to a predetermined pattern. For example, the jamming pattern switch 1822 may insert the S jamming sample signals generated by the jamming sequence generator 1821 into the S sample IFFT output signals generated by the IFFT block 1814 according to a pattern indicated by the DL jamming signal pattern information 803 of FIG. 8, the UL jamming signal pattern information 804 of FIG. 8, the DL jamming signal pattern information 1612 of FIG. 16A, and the UL jamming signal pattern information 1622 of FIG. 16B.

For example, the jamming pattern switch 1822 may insert the S jamming sample signals into the S sample IFFT output signals to generate the time domain transmission signals 941 to 945 of FIG. 9, the frequency domain signals 1021 to 1025 of FIG. 10, or the time domain transmission signals 1151 to 1155 of FIG. 10.

The CP inserter 1823 may insert CPs into the S sample IFFT output signals into which the S jamming sample signals are inserted. For example, the CP inserter 1823 may perform the operation of inserting the first to fifth CPs 941 to 945 in FIG. 9, the operation of inserting the first to fifth CPs 1051 to 1055 in FIG. 10, or the operation of inserting the first to fifth CPs 1171 to 1175 in FIG. 11. The CP inserter 1823 may transmit the CP-inserted output signals to the transmission RF chain 1702 and the reference signal generator 1705 of FIG. 17.

A structure of a baseband reception modem corresponding to the baseband transmission modem 1800 will be described with reference to FIG. 19.

Figure 19:
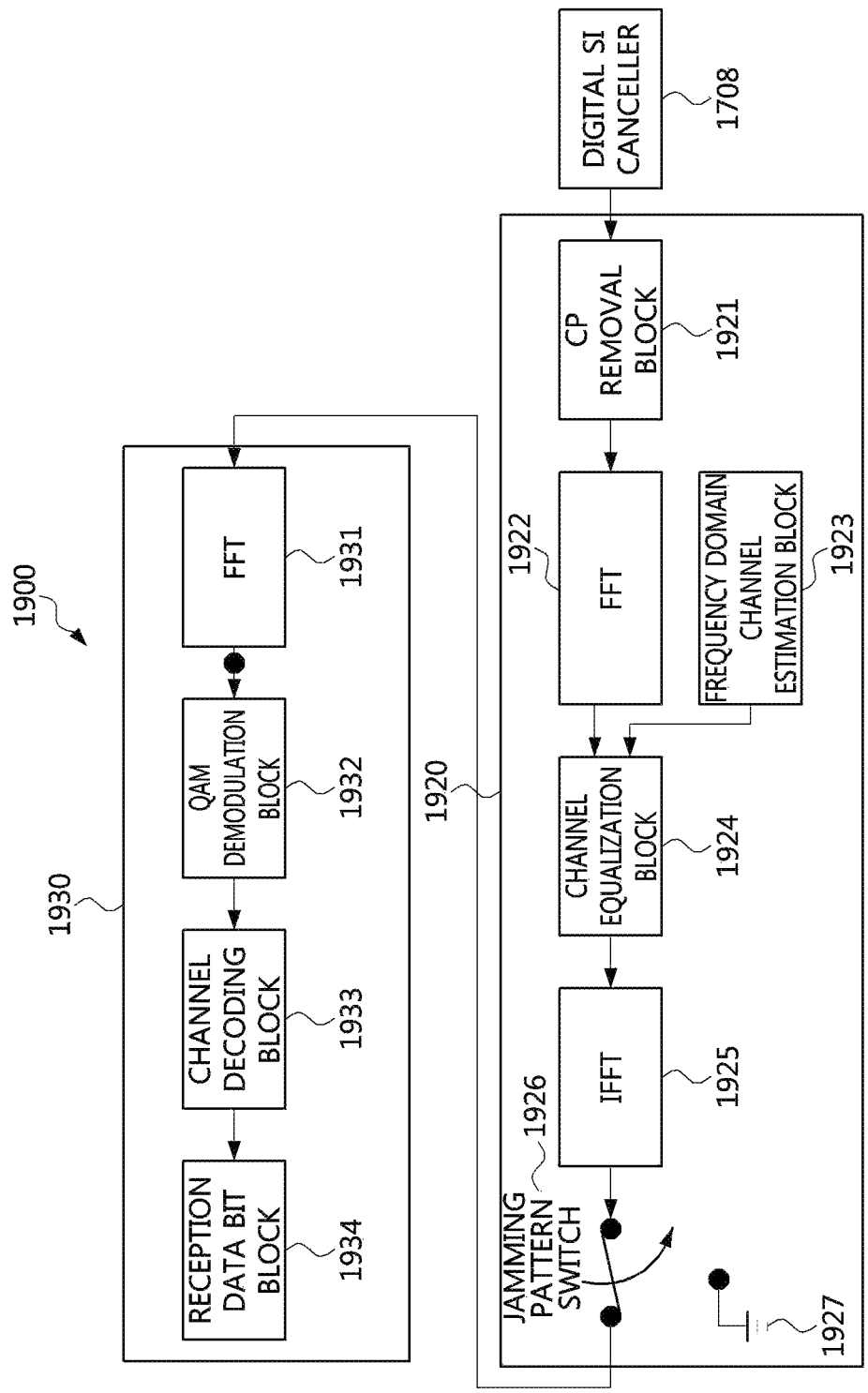
FIG. 19 is a block diagram illustrating a structure of a baseband reception modem of a transceiver according to a third embodiment of the present disclosure.

FIG. 19 is a block diagram illustrating a structure of a baseband reception modem of a transceiver according to a third embodiment of the present disclosure.

Referring to FIG. 19, a baseband reception modem 1900 may be the baseband reception modem 1709 of FIG. 17. The baseband reception modem 1900 may comprise a jamming sequence removal unit 1920 and a modem unit 1930.

The jamming sequence removal unit 1920 may include a CP removal block 1921, a FFT block 1922, a frequency domain channel estimation block 1923, a channel equalization block 1924, a IFFT block 1925, a jamming pattern switch 1926, and a ground block 1927. The modem unit 1930 may include a FFT block 1931, a QAM demodulation block 1932, a channel decoding block 1933, and a reception data bit block 1934.

The CP removal block 1921 may receive the SI-cancelled signal from the digital SI canceller 1708 of FIG. 17. The CP removal block 1921 may remove the CP from the SI-cancelled signal. The FFT block 1922 may perform a FFT on the CP removed signal by the CP removal block 1921.

The frequency domain channel estimation block 1923 may estimate a frequency domain channel. For example, the frequency domain channel estimation block 1923 may generate channel information indicating a result of estimating a frequency domain channel based on the SI-cancelled signal.

The channel equalization block 1924 may equalize the signal processed by the FFT block 1922 based on the channel information. The IFFT block 1925 may perform an IFFT on the equalized signal by the channel equalization block 1924 to output a time domain signal.

The jamming pattern switch 1926 may remove the jamming sequence included in the time domain signal. The jamming pattern switch 1926 may transfer the jamming sequence included in the time domain signal to the ground block 1927. The ground block 1927 may ground the jamming sequence transmitted from the jamming pattern switch 1926.

For example, the jamming pattern switch 1926 may remove the jamming sequence in the time domain signal based on the DL jamming signal pattern information 803 and the DL jamming signal length information 805 in FIG. 8. Alternatively, the jamming pattern switch 1926 may remove the jamming sequence in the time domain signal based on the UL jamming signal pattern information 804 and the UL jamming signal length information 806 in FIG. 8.

Alternatively, the jamming pattern switch 1926 may remove the jamming sequence in the time domain signal based on the DL jamming signal pattern information 1612 and the DL jamming signal length information 1613 in FIG. 16A. Alternatively, the jamming pattern switch 1926 may remove the jamming sequence in the time domain signal based on the UL jamming signal pattern information 1622 and the UL jamming signal length information 1623 in FIG. 16B.

The FFT block 1931 may perform a FFT on the time domain signal from which the jamming sequence has been removed. The QAM demodulation block 1932 may demodulate the signal processed by the FFT block 1931. For example, the QAM demodulation block 1932 may demodulate the signal processed by the FFT block 1931 to obtain a frequency domain signal for S subcarriers.

The channel decoding block 1933 may decode the signal demodulated by the QAM demodulation block 1932. The reception data bit block 1934 may obtain reception data bits from the signal decoded by the channel decoding block 1933.

A structure of the baseband transmission modem according to a fourth embodiment of the present disclosure corresponding to the baseband reception modem 1900 will be described with reference to FIG. 20.

Figure 20:
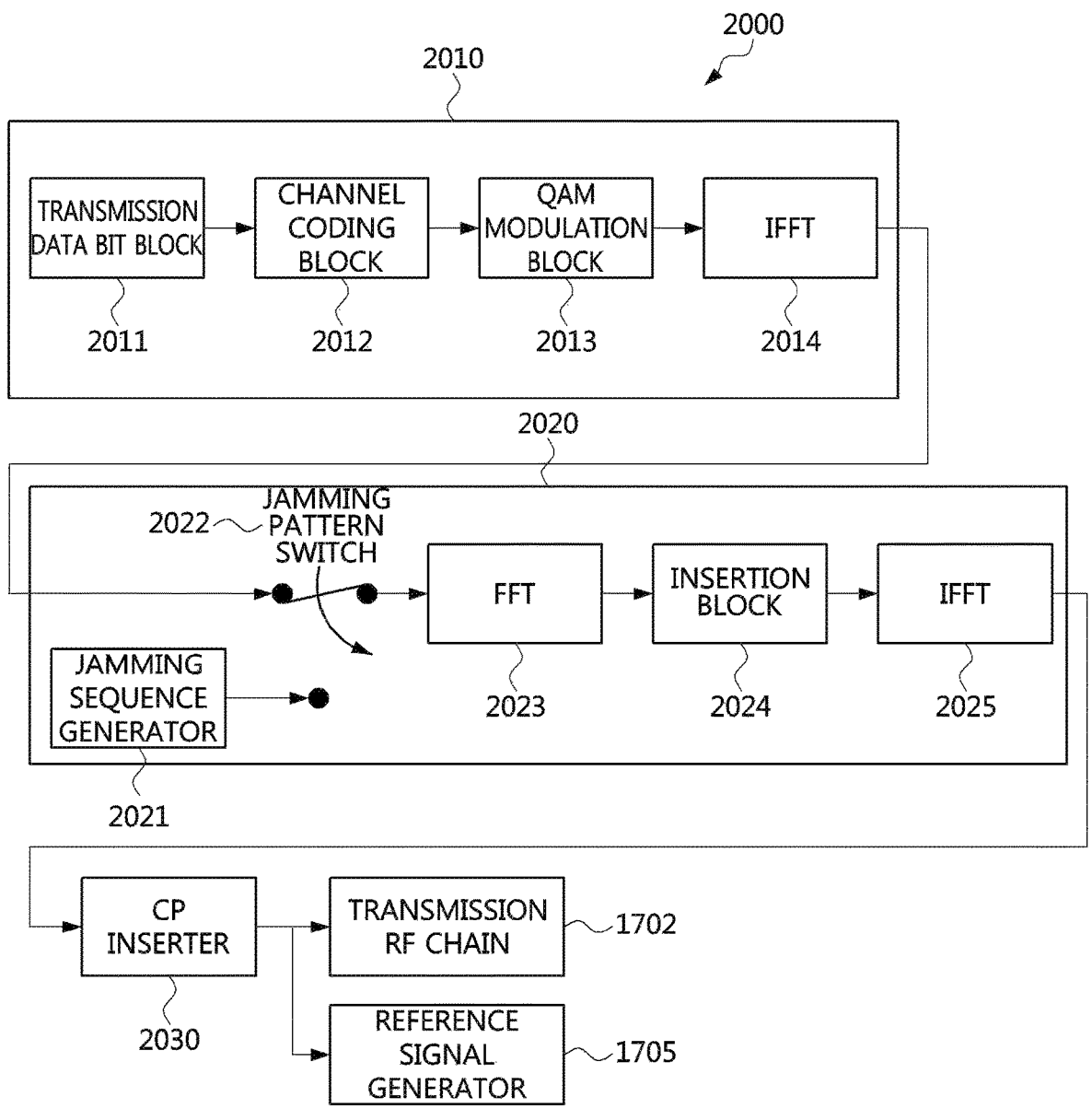
FIG. 20 is a block diagram illustrating a structure of a baseband transmission modem of a transceiver according to a fourth embodiment of the present disclosure.

FIG. 20 is a block diagram illustrating a structure of a baseband transmission modem of a transceiver according to a fourth embodiment of the present disclosure.

Referring to FIG. 20, a baseband transmission modem 2000 may be the baseband transmission modem 1701 of FIG. 17. The baseband transmission modem 2000 may include a modem unit 2010, a jamming sequence insertion unit 2020, and a CP inserter 2030.

The modem unit 2010 may include a transmission data bit block 2011, a channel coding block 2012, a QAM modulation block 2013, and an IFFT block 2014. The jamming sequence insertion unit 2020 may include a jamming sequence generator 2021, a jamming pattern switch 2022, a FFT block 2023, an insertion block 2024, and an IFFT block 2025.

Here, the transmission data bit block 2011 may operate in the same or similar manner as the transmission data bit block 1811 in FIG. 18. The channel coding block 2012 may operate in the same or similar manner as the channel coding block 1812 of FIG. 18. The QAM modulation block 2013 may operate in the same or similar manner as the QAM modulation block 1813 of FIG. 18. The IFFT block 2014 may operate in the same or similar manner as the IFFT block 1814 of FIG. 18. The jamming sequence generator 2021 may operate in the same or similar manner as the jamming sequence generator 1821 of FIG. 18. The jamming pattern switch 2022 may operate in the same or similar manner as the jamming pattern switch 1822 of FIG. 18.

The baseband transmission modem 2000 may utilize some of entire subcarriers of the operation frequency band as null subcarriers. For example, the total number of subcarriers may be N. Here, the number of actually occupied subcarriers may be $N_{OCC}$. That is, the number of null subcarriers may be $(N-N_{OCC})$. Meanwhile, the number of data symbols output by the IFFT block 2014 may be S. That is, $N > N_{OCC} \geq S$.

For example, the jamming sequence generator 2021 may generate $(N_{OCC}-S)$ jamming sample signals. The jamming pattern switch 2022 may generate $N_{OCC}$ sample signals by inserting $(N_{OCC}-S)$ jamming sample signals into S data symbols according to a pattern indicated by the DL jamming signal pattern information 803 of FIG. 8, the UL jamming signal pattern information 804 of FIG. 8, the DL jamming signal pattern information 1612 of FIG. 16A, or the UL jamming signal pattern information 1622 of FIG. 16B.

The FFT block 2023 may perform a FFT on the $N_{OCC}$ sample signals. The Insertion block 2024 may insert the $N_{OCC}$ sample signals on which the FFT has been performed into $N_{OCC}$ occupied subcarriers. In addition, the insertion block 2024 may generate a frequency domain transmission signal including N subcarriers by adding $(N-N_{OCC})$ null subcarriers to the $N_{OCC}$ occupied subcarriers into which $N_{OCC}$ sample signals have been inserted. The IFFT block 2025 may perform an IFFT on the frequency domain transmission signal including N subcarriers to generate a time domain transmission signal.

The CP inserter 2030 may operate in the same or similar manner as the CP inserter 1823 of FIG. 18. The CP inserter 2030 may insert CPs into the time domain transmission signals to generate OFDM transmission symbols. The CP inserter 2030 may transfer the OFDM transmission symbols in which the CPs have been inserted to the transmission RF chain 1702 and the reference signal generator 1705 of FIG. 17.

Figure 21:
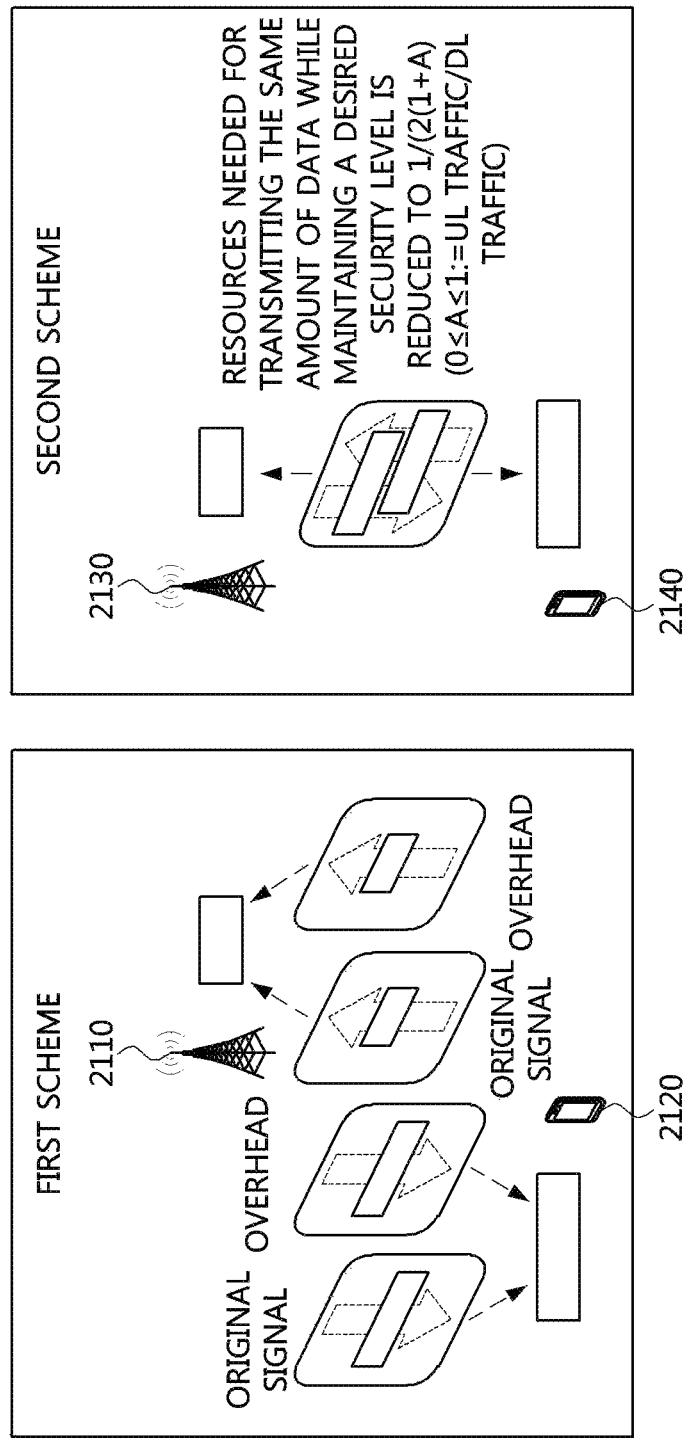
FIG. 21 is a conceptual diagram for explaining a data transmission rate between a base station and a terminal in a wireless communication system according to various embodiments of the present disclosure.

FIG. 21 is a conceptual diagram for explaining a data transmission rate between a base station and a terminal in a wireless communication system according to various embodiments of the present disclosure.

Referring to FIG. 21, a base station 2110 operating in a first scheme may generate a DL security signal by adding a separate signal for security to an original signal. Similarly, a terminal 2120 operating in the first scheme may generate a UL security signal by adding a separate signal for security to an original signal. Here, the DL security signal and the UL security signal may be transmitted through different frequency bands. Therefore, a separate additional overhead may be generated for each of the DL security signal and the UL security signal. Also, since the base station 2110 and the terminal 2120 operating in the first scheme transmit signals through frequency bands to each other, the data transmission rate may decrease.

On the other hand, a base station 2130 operating in a second scheme may transmit a DL signal in which a data signal and a jamming signal are mixed to a terminal 2140. Here, the base station 2130 may transmit the DL signal to the terminal 2140 through the same frequency band in which a UL signal is transmitted by the terminal 2140.

Similarly, the terminal 2140 operating in the second scheme may transmit the UL signal mixed with a data signal and a jamming signal to the terminal 2130. Here, the terminal 2140 may transmit the UL signal to the base station 2130 through the same frequency band as the frequency band in which the DL signal is transmitted by the base station 2130.

Therefore, since the DL signal and the DL signal are simultaneously transmitted according to the second scheme through the same frequency band, thereby increasing the data transmission rates of the DL and UL. Also, since the DL signal and the UL signal are simultaneously transmitted through the same frequency band, they may operate as a jamming signal to each other.

Also, the base station 2130 or the terminal 2140 operating in the second scheme may generate the jamming signal by using unused resources according to the data traffic asymmetry between the UL and the DL. Thus, no additional overhead for generating a security signal may occur.

For example, when a ratio of the UL data traffic to the DL data traffic is a ($0 \leq \alpha \leq 1$), the data transmission rate of the second scheme is $2(1+\alpha)$ times the data transmission rate of the conventional scheme. Thus, a capacity gain of the data transmission rate of the second scheme may be shown in a graph of FIG. 22.

Figure 22:
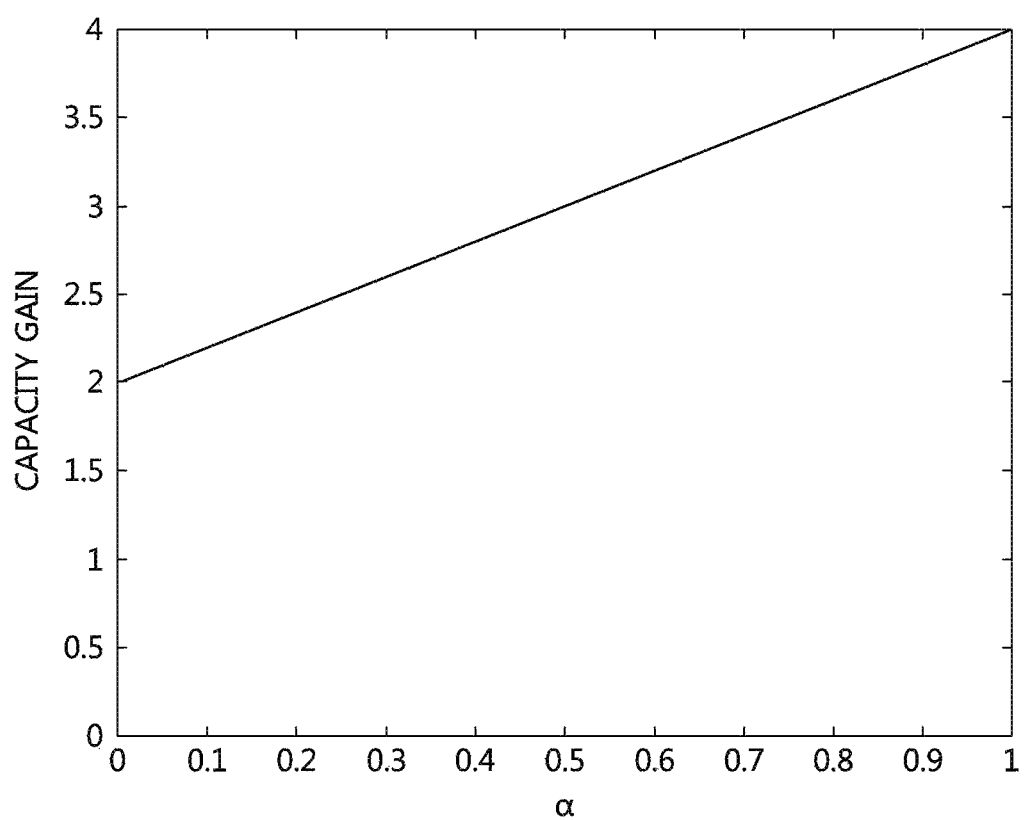
FIG. 22 is a graph illustrating a capacity gain of a data transmission rate of data transmitted and received between a base station and a terminal in a wireless communication system according to various embodiments of the present disclosure.

FIG. 22 is a graph illustrating a capacity gain of a data transmission rate of data transmitted and received between a base station and a terminal in a wireless communication system according to various embodiments of the present disclosure.

Referring to FIG. 22, the x-axis may represent the ratio $\alpha$ of the UL data traffic to the DL data traffic. Also, the y-axis may represent the capacity gain of the data transmission rate of the second scheme to the data transmission rate of the first scheme in FIG. 21. For example, when $\alpha=0.125$, the data transmission rate of the second scheme may obtain a capacity gain of 2.25 times the conventional data transmission rate. Further, when $\alpha=0.5$, the data transmission rate of the second scheme may acquire a capacity gain of three times the conventional data transmission rate of the first scheme. That is, the capacity gain of the second scheme may be proportional to the value of $\alpha$.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal, in a wireless communication system, the operation method being implemented by a processor executing instructions stored in a non-transitory machine-readable data storage medium and comprising:
    transmitting uplink (UL) traffic information indicating a size of a UL data signal to a base station;
    receiving a jamming message generated based on the UL traffic information from the base station;
    generating an uplink (UL) transmission signal including the UL data signal and a UL jamming signal based on the jamming message; and
    transmitting the UL transmission signal to the base station,
    wherein the jamming message indicates a pattern of the UL jamming signal, the UL transmission signal is transmitted in a same frequency band as a frequency band in which a downlink (DL) transmission signal of the base station is received, and the UL jamming signal is transmitted in remaining resources excluding resources occupied by the UL data signal in the frequency band.

2. The operation method according to claim 1, wherein the UL jamming signal is mixed with the UL data signal in at least one of time domain and frequency domain according to the pattern indicated by the jamming message and then transmitted in the frequency band.

3. The operation method according to claim 1, wherein a size of the remaining resources corresponds to a difference between a size of resources occupied by the UL data signal and a size of resources occupied by a DL data signal in the frequency band.

4. The operation method according to claim 1, wherein a DL jamming signal is mixed with a DL data signal according to the pattern indicated by the jamming message, the DL jamming signal is transmitted through remaining resources excluding resources occupied by the DL data signal in the frequency band, and the DL jamming signal is removed from the DL transmission signal according to the pattern indicated by the jamming message.

5. The operation method according to claim 1, wherein the UL traffic information is included in a radio resource control (RRC) layer message transmitted to the base station.

6. An operation method of a base station, in a wireless communication system, the operation method being implemented by a processor executing instructions stored in a non-transitory machine-readable data storage medium and comprising:
    receiving uplink (UL) traffic information indicating a size of a UL data signal from a terminal;
    generating a jamming message indicating a pattern of a UL jamming signal based on the UL traffic information;
    transmitting the jamming message to the terminal;
    receiving a UL transmission signal including the UL jamming signal generated based on the jamming message from the terminal; and
    transmitting a downlink (DL) transmission signal to the terminal in a same frequency band as a frequency band in which the UL transmission signal is received,
    wherein the UL jamming signal is received in remaining resources excluding resources occupied by the UL data signal in the frequency band.

7. The operation method according to claim 6, wherein the UL jamming signal is mixed with the UL data signal in at least one of time domain and frequency domain according to the pattern indicated by the jamming message and then transmitted in the frequency band.

8. The operation method according to claim 6, wherein a size of the remaining resources corresponds to a difference between a size of resources occupied by the UL data signal and a size of resources occupied by a DL data signal in the frequency band.

9. The operation method according to claim 6, wherein the UL jamming signal is removed from the UL transmission signal according to the pattern indicated by the jamming message.

10. The operation method according to claim 6, wherein the UL traffic information is included in a radio resource control (RRC) layer message received from the terminal.

11. An operation method of a base station, in a wireless communication system, the operation method being implemented by a processor executing instructions stored in a non-transitory machine-readable data storage medium and comprising:
- receiving uplink (UL) traffic information indicating a size of a UL data signal from a first terminal;
- generating a UL jamming message indicating a first pattern of a UL jamming signal based on a size of the UL data signal;
- generating a downlink (DL) jamming message indicating a second pattern of a DL jamming signal based on a size of the UL data signal and a size of a DL data signal to be transmitted to a second terminal;
- transmitting the UL jamming message to the first terminal;
- transmitting the DL jamming message to the second terminal;
- receiving a UL transmission signal including the UL jamming signal generated based on the UL jamming message from the first terminal; and
- transmitting a DL transmission signal including the DL jamming signal generated based on the DL jamming message to the second terminal.

12. The operation method according to claim 11, wherein the DL transmission signal is transmitted in a same frequency band as a frequency band in which the UL transmission signal is received.

13. The operation method according to claim 11, wherein the DL jamming signal is transmitted in remaining resources excluding resources occupied by the DL data signal in the frequency band in which the DL transmission signal is transmitted.

14. The operation method according to claim 11, wherein the UL jamming signal is transmitted in remaining resources excluding resources occupied by the UL data signal in the frequency band in which the UL transmission signal is transmitted.

15. The operation method according to claim 11, wherein the DL jamming signal is mixed with the DL data signal in at least one of time domain and frequency domain according to the second pattern indicated by the DL jamming message and then transmitted in the frequency band.

16. The operation method according to claim 11, wherein the UL jamming signal is mixed with the UL data signal in at least one of time domain and frequency domain according to the first pattern indicated by the UL jamming message and then transmitted in the frequency band.

17. The operation method according to claim 11, wherein the UL jamming signal is removed from the UL transmission signal according to the first pattern indicated by the UL jamming message.

18. The operation method according to claim 11, wherein the UL traffic information is included in a radio resource control (RRC) layer message received from the terminal.

19. The operation method according to claim 11, wherein the DL jamming message includes co-channel interference cancelation (CCIC) information indicating whether the first terminal performs a CCIC operation, the CCIC indication information is generated based on CCI channel feedback information indicating a degree of CCI, which is received from the second terminal, the CCI channel feedback information is generated based on a strength of a signal transmitted by the first terminal, and the strength of the signal transmitted by the first terminal is measured based on the UL traffic information received from the first terminal.

20. The operation method according to claim 19, wherein the UL jamming message includes power control information indicating a transmission power of the first terminal, and the power control information is generated based on the CCI channel feedback information.

* * * * *